United States Patent
Li et al.

(10) Patent No.: US 10,419,787 B2
(45) Date of Patent: *Sep. 17, 2019

(54) DYNAMIC PROGRAMMING ACROSS MULTIPLE STREAMS

(71) Applicant: Cisco Technology, Inc., San Jose, CA (US)

(72) Inventors: Zhi Li, Mountain View, CA (US); Joshua B. Gahm, Newton, MA (US); Xiaoqing Zhu, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/728,681

(22) Filed: Oct. 10, 2017

(65) Prior Publication Data

US 2018/0035140 A1 Feb. 1, 2018

Related U.S. Application Data

(63) Continuation of application No. 14/519,628, filed on Oct. 21, 2014, now Pat. No. 9,794,601.

(51) Int. Cl.
*H04N 21/2343* (2011.01)
*H04L 29/06* (2006.01)
(Continued)

(52) U.S. Cl.
CPC ... *H04N 21/234381* (2013.01); *H04L 65/602* (2013.01); *H04L 65/605* (2013.01);
(Continued)

(58) Field of Classification Search
CPC ....... H04N 21/23481; H04N 21/23439; H04N 21/23805; H04N 21/2385; H04N 21/2662;
(Continued)

(56) References Cited

U.S. PATENT DOCUMENTS 8,532,171 B1 9/2013 Narayanan
9,049,271 B1 6/2015 Hobbs
(Continued)

OTHER PUBLICATIONS

Zhang et al.,"Out of Band Signalling for Quality Driven Adaptation", 103. MPEG Meeting, Jan. 21, 2013-Jan. 25, 2013; Geneva; (Motion Picture Expert Group or ISO/IEC JTC1/SC29/WG11), No. m28169, Jan. 16, 2013 (Jan. 16, 2013), XP030056716.
(Continued)

*Primary Examiner* — Pankaj Kumar
*Assistant Examiner* — Alexander Boyd
(74) *Attorney, Agent, or Firm* — Merchant & Gould P.C.

(57) ABSTRACT

Various implementations disclosed herein enable a more efficient allocation of one or more shared network resources (e.g., bandwidth, memory, processor time, etc.) amongst a number of client devices based on media content data complexity and client device resource constraints in order to better manage perceptual playback quality of adaptive streaming content. In some implementations, a method includes aligning sequences of one or more temporal segments such that time boundaries of temporal segments across the sequences are in alignment; and, selecting segment representations for each temporal segment based on a combination of the sequence alignment and perceptual quality level values associated with available segment representations, such that a combination of resulting perceptual quality levels satisfies a joint quality criterion. Each sequence is associated with a respective one of a number of client devices sharing a network resource and an instance of a respective video stream. The one or more temporal segments of each sequence are used to provide segment representations of media content data to one of the client devices. The alignment of time boundaries of temporal segments is achieved at least in part by adjusting performance charac-
(Continued)

teristics associated with at least some of the one or more temporal segments.

20 Claims, 10 Drawing Sheets

(51) Int. Cl.
| | |
|---|---|
| *H04N 21/238* | (2011.01) |
| *H04N 21/2385* | (2011.01) |
| *H04N 21/2662* | (2011.01) |
| *H04N 21/647* | (2011.01) |
| *H04N 21/845* | (2011.01) |
| *H04L 12/825* | (2013.01) |

(52) U.S. Cl.
CPC ......... *H04L 65/80* (2013.01); *H04N 21/2385* (2013.01); *H04N 21/23439* (2013.01); *H04N 21/23805* (2013.01); *H04N 21/2662* (2013.01); *H04N 21/64769* (2013.01); *H04N 21/8456* (2013.01); *H04L 47/25* (2013.01)

(58) Field of Classification Search
CPC .......... H04N 21/64769; H04N 21/8456; H04L 65/602; H04L 65/605; H04L 65/80; H04L 47/25

See application file for complete search history.

(56) References Cited

U.S. PATENT DOCUMENTS

| | | | |
|---|---|---|---|
| 2010/0091888 | A1 | 4/2010 | Nemiroff |
| 2011/0126248 | A1 | 5/2011 | Fisher |
| 2011/0296486 | A1 | 12/2011 | Nilsson et al. |
| 2013/0070839 | A1 | 3/2013 | Magee |
| 2013/0091297 | A1 | 4/2013 | Minder |
| 2013/0103849 | A1 | 4/2013 | Mao |
| 2013/0286879 | A1 | 10/2013 | Elarabaway |
| 2014/0181266 | A1 | 6/2014 | Joch |
| 2015/0281752 | A1 | 10/2015 | Van Veldhuisen |
| 2016/0353148 | A1* | 12/2016 | Prins ................ H04N 21/21805 |

OTHER PUBLICATIONS

International Search Report and Written Opinion for PCT/US2015/055083 dated Jan. 26, 2016.

\* cited by examiner

DYNAMIC PROGRAMMING ACROSS MULTIPLE STREAMS

RELATED APPLICATION

This application is a continuation application of U.S. patent application Ser. No. 14/519,628, filed on Oct. 21, 2014, entitled "DYNAMIC PROGRAMMING ACROSS MULTIPLE STREAMS." The contents of U.S. patent application Ser. No. 14/519,628 are incorporated here by reference in its entirety.

TECHNICAL FIELD

The present disclosure relates to data networks, and in particular, to resource allocation and rate selection for client devices based on data complexity and device status.

BACKGROUND

Increases in data-intensive video traffic signal both an enhancement of and a substitute for conventional broadcast cable access technologies. However, data-intensive video traffic can strain existing infrastructure and frustrate new infrastructure planning efforts because previously known network management methods do not consider user experience metrics. According to previously known network management methods a network is generally managed based on bandwidth utilization, with nominal levels of bandwidth allocated to client devices. Bandwidth allocations are often tied to a subscription tier model, where client devices in each tier receive a respective bandwidth allocation for a corresponding cost. While these known methods are convenient to administer, there are a number of unresolved problems.

Existing systems use encoding bitrate values as a surrogate for perceptual playback quality metrics. However, perceptual playback quality can vary within a fixed allocation of bandwidth based on the complexity of media content data and client device resource constraints. That is, the respective perceptual playback qualities achieved by different client devices that are each allocated the same amount of bandwidth may be different based on the respective complexities of the media content and/or device resource constraints of each client device. Another problem is that bandwidth is inefficiently used and often fails to support sufficient playback quality. For example, as a result of providing a group of client devices the same nominal allocations of bandwidth, some client devices are provided with more bandwidth than needed to satisfy perceptual playback quality preferences, and other client devices are not provided enough bandwidth to satisfy perceptual playback quality preferences.

As such, network operators cannot adequately monitor and manage existing infrastructure, adequately plan new infrastructure deployments, or adequately constrain the operation of adaptive bit rate (ABR) enabled client devices that share network resources.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
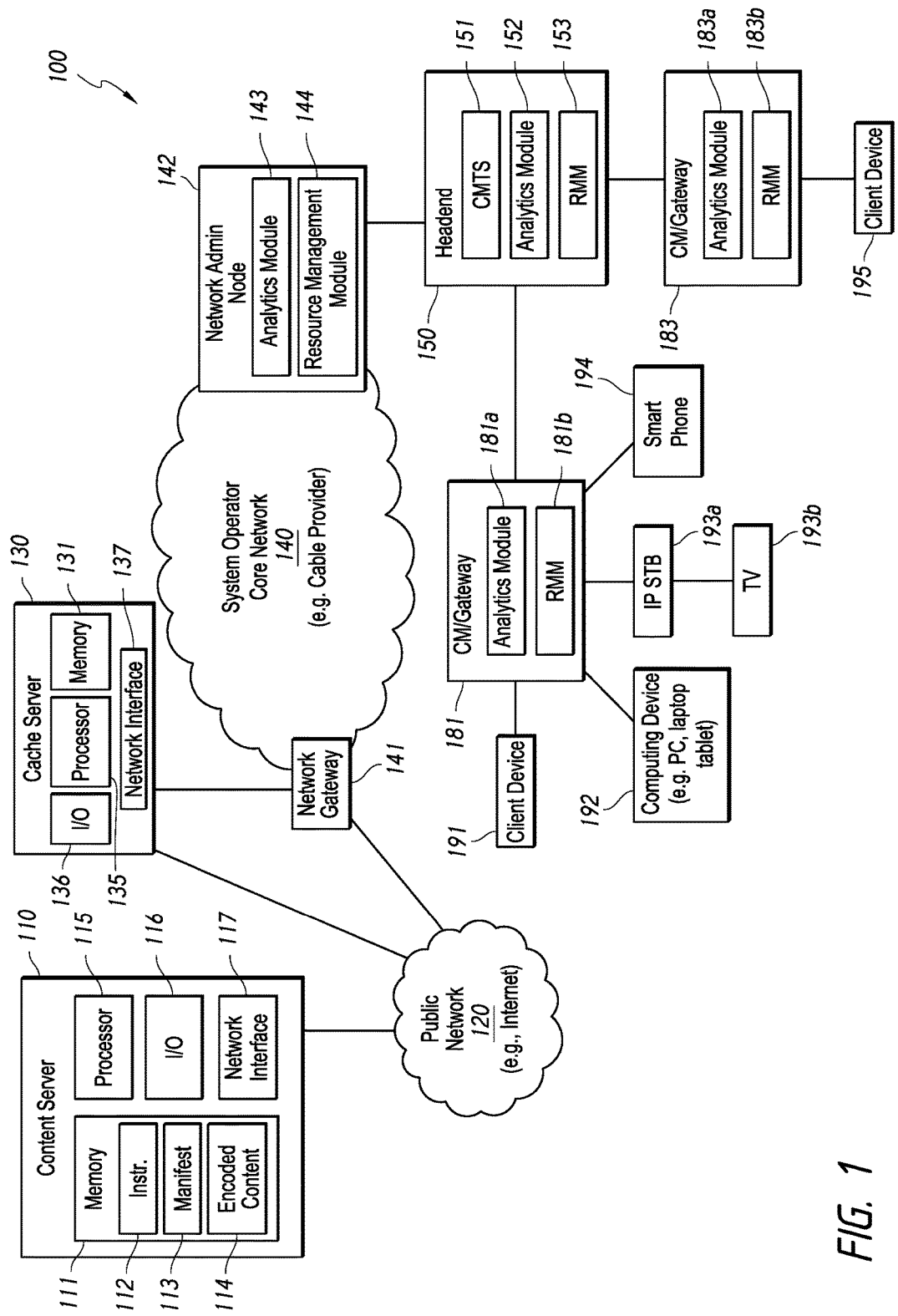
FIG. 1 is a block diagram of a data communication environment in accordance with some implementations.

In accordance with common practice various features shown in the drawings may not be drawn to scale, as the dimensions of various features may be arbitrarily expanded or reduced for clarity. Moreover, the drawings may not depict all of the aspects and/or variants of a given system, method or apparatus admitted by the specification. Finally, like reference numerals are used to denote like features throughout the figures.

DESCRIPTION

Numerous details are described herein in order to provide a thorough understanding of the illustrative implementations shown in the accompanying drawings. However, the accompanying drawings merely show some example aspects of the present disclosure and are therefore not to be considered limiting. Those of ordinary skill in the art will appreciate from the present disclosure that other effective aspects and/or variants do not include all of the specific details described herein. Moreover, well-known systems, methods, components, devices and circuits have not been described in exhaustive detail so as not to unnecessarily obscure more pertinent aspects of the implementations described herein.

Overview

Previously known resource allocation methods ineffectively allocate shared network resources amongst client devices without regard to client-side perceptual playback quality. In particular, encoding bitrate values are poor surrogate for assessing perceptual playback quality, because perceptual playback quality varies widely within a fixed allocation of bandwidth. By contrast, implementations disclosed herein enable a more efficient allocation of one or more shared network resources (e.g., bandwidth, memory, processor time, etc.) amongst a number of client devices based on media content data complexity and client device resource constraints in order to better manage perceptual playback quality of adaptive streaming content. In some implementations, a method includes aligning sequences of one or more temporal segments such that time boundaries of temporal segments across the sequences are in alignment; and, selecting segment representations for each temporal segment based on a combination of the sequence alignment and perceptual quality level values associated with available segment representations, such that a combination of resulting perceptual quality levels satisfies a joint quality criterion. Each sequence is associated with a respective one of a number of client devices sharing a network resource and an instance of a respective video stream. The one or more temporal segments of each sequence are used to provide segment representations of media content data to one of the client devices. The alignment of time boundaries of temporal segments is achieved at least in part by adjusting performance characteristics associated with at least some of the one or more temporal segments.

More specifically, in some implementations, a method includes managing perceptual playback quality for a number of client devices by allocating portions of shared bandwidth to the client devices based on quality metrics of segmented video data, enforcing segment alignment across client devices, and at least one buffer boundary condition. In various implementations, satisfying the joint quality criterion across the sequences is an indicator of at least one of: an increase in the number of sequences that are provided within a fixed and shared allocation of bandwidth; a more even distribution of perceptual quality level values amongst client devices within a particular subscription tier; an increase in an aggregation of respective resulting perceptual quality level values for corresponding client devices sharing a fixed allocation of bandwidth; and a decrease in an aggregate distortion level characterizing respective distortion levels associated with corresponding client devices sharing a fixed allocation of bandwidth.

FIG. 1 is a block diagram of a data communication environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the data communication environment 100 includes a public network 120 (e.g., a portion of the Internet), a system operator core network 140 (hereinafter "core network 140"), a content server 110, a cache server 130, and a headend node 150. The data communication environment 100 also includes subscriber gateway devices 181, 183 and a number of client devices 191, 192, 193a, 193b, 194, 195.

In some implementations, the core network 140 includes a private and/or subscription-based network. The core network 140 includes any LAN and/or WAN, such as an intranet, an extranet, a virtual private network, and/or portions of the Internet. In some implementations, the core network 140 provides communication capability between any one of the client devices 191, 192, 193a, 193b, 194, 195 and one or more third party service providers and/or content providers (e.g., content server 110, cache server 130, etc.). In some implementations, the core network 140 provides communication capability between any one of the client devices 191, 192, 193a, 193b, 194, 195 and one or more private content servers, storage devices, gateways and/or service servers (not shown), as well as core network provided services and content. In some implementations, the core network 140 uses HyperText Transport Protocol (HTTP) to transport information using the Transmission Control Protocol/Internet Protocol (TCP/IP). HTTP permits client devices to access various resources available via the core network 140 and/or the public network 120. However, implementations are not limited to the use of any particular protocol. One having ordinary skill in the art should understand that other networks distributing multimedia (e.g., video, graphics, audio, and/or data, or otherwise referred to also herein individually or collectively as media content or simply, content) may also benefit from certain embodiments of adaptive streaming systems and methods, and hence, are contemplated to be within the scope of the disclosure. The term "resource" in this specification refers to information, devices, infrastructure, and services. A resource includes, for example, bandwidth, processor time, data storage, data structures, non-transitory memory, images, video streams, network transactions, and computational objects. In various implementations, the core network 140 includes a combination of computing devices, switches, routers, server systems, enterprise memory, and data connections.

As shown in FIG. 1, in some implementations, the core network 140 includes a gateway node 141 that provides an interface for data communication external to the core network 140 (e.g., to the public network 120, the content server 110, the cache server 130, etc.). In some implementations, the gateway node 141 is provided as a single entity (e.g., a server, a virtual machine, etc.). In some implementations, the gateway node 141 is implemented as a distributed system including a suitable combination of software, data structures, virtual machines, computing devices, servers, switches and routers. For the sake of brevity and convenience of explanation, the gateway node 141 is described herein as a single entity.

The core network 140 also includes a network administration node 142 or the like, which is arranged to monitor and/or manage one or more headend nodes. Similar to the gateway node 141, the network administration node 142 is illustrated as single entity (e.g., a server, virtual machine, etc.) in FIG. 1. In various implementations, however, the network administration node 142 is provided as a distributed system including a suitable combination of software, data structures, virtual machines, computing devices, servers, switches and routers. Accordingly, the network administration node 142 is described herein as a single entity merely for the sake of brevity and convenience of explanation.

In some implementations, the network administration node 142 includes at least one of an analytics module 143 and a resource management module 144. In some implementations, the analytics module 143 is provided to obtain client device segment representation selections, associated perceptual playback quality values, and one or more device resource constraints for each of the client devices sharing the one or more shared network resources. As described below, the resource management module 144 is configured to enable network-centric concerted management of respective resource allocations provided to a plurality of client devices. In some implementations, respective resource allocations are determined to enable a more efficient allocation of one or more shared network resources, aimed at managing perceptual playback quality, amongst a plurality of client devices based on media content data complexity and client device resource constraints; and/or, to enable client devices to cooperatively participate in the allocation and consumption of the one or more network resources in order to produce more evenly distributed perceptual playback quality levels within each subscription tier. The respective levels of perceptual playback quality are managed by adjusting client device access to one or more shared network resources. In some implementations, the resource management module 144 is configured to jointly determine a respective encoding rate level and a corresponding resource allocation for each of the plurality of client devices based on a combination of one or more resource constraint values, enforcing segment alignment across client devices, and the assessment of the respective perceptual quality level values, such that a combination of resulting quality levels satisfies a joint quality criterion. In various implementations, satisfying the joint quality criterion across the sequences is an indicator of at least one of: an increase in the number of sequences that are provided within a fixed and shared allocation of bandwidth; a more even distribution of perceptual quality level values amongst client devices within a particular subscription tier; an increase in an aggregation of respective resulting perceptual quality level values for corresponding client devices sharing a fixed allocation of bandwidth; and a decrease in an aggregate distortion level characterizing respective distortion levels associated with corresponding client devices sharing a fixed allocation of bandwidth.

In some implementations, the source management module 144 is configured to control the service rate (and/or other resource allocations) to client devices on a bottleneck link. In some implementations, per-client service rates are updated periodically. In some implementations, this is accomplished using network QoS features, such as weighted-fair-queuing (WFQ). The analytics module 143 and the resource management module 144 are not limited to implementation in or proximate to the network administration node 142. In various implementations, modules similar to one or both are included in headend nodes or other network bottleneck points. For example, in some implementations, modules similar to one or both are included in one or more of a mobile network, a mobile packet core, a WiFi access point, a cable modem and a residential gateway device.

The headend node 150 is coupled to the network administration node 142 and/or one or more other portions of the core network 140. In some implementations, the headend node 150 is capable of data communication using the public network 120 and/or other private networks (not shown). Those of ordinary skill in the art will appreciate that a headend node is configured to deliver cable TV, cable modem services and/or various other data services to subscriber client devices. To that end, a typical headend node includes a suitable combination of software, data structures, virtual machines, routers, switches and high-availability servers. For example, the headend node 150 includes a cable modem termination server (CMTS) 151 that is used to service an allocation of bandwidth shared by a number of client devices. The CMTS 151 includes a suitable combination of hardware, software and firmware for terminating one or more data channels associated with a number of client devices within the shared allocation of bandwidth. In some implementations, the headend node 150 includes at least one of an analytics module 153 and a resource management module (RMM) 154. As described below with reference to FIG. 2, the analytics module 153 is configured to obtain a plurality of resource constraint values associated with a plurality of client devices sharing a network resource in order to each receive media content data, and encoding rate selections associated with the traffic on bandwidth available through and managed by the headend node 150. In some implementations, the resource management module 154 is configured to jointly determine a respective encoding rate level selection and a corresponding resource allocation for each of the plurality of client devices based on a combination of one or more resource constraint values, enforcing segment alignment across client devices, and the assessment of the respective perceptual quality level values, such that a combination of resulting quality levels satisfies a joint quality criterion for a number of client devices that share one or more network resources available through the headend node 150. Further, while the analytics module 152 and the resource management module 153 are shown as distinct modules, in some implementations, some or all of the functions of each are incorporated into a CMTS or the like.

Client devices access network resources, services and content offerings from a respective headend node through subscriber gateway devices. For example, as shown in FIG. 1, the subscriber gateway devices 181, 183 are coupled to the headend node 150, and thus share bandwidth (and/or other resources) available through the headend node 150. In various implementations, a subscriber gateway device includes, without limitation, devices such as cable modems (CM), wireless access points, and Ethernet modems.

Each subscriber gateway device 181, 183 is accessible by and services a number of client devices. For example, the client device 195 is coupled to the subscriber gateway device 183. Similarly, the subscriber gateway device 181 is coupled to and delivers services and/or content to a client device 191, a computing device 192, a smartphone 194, and an IP set-top box (STB) 193a (which in turn is coupled to TV 193b). As such, the bandwidth allocated to the subscriber gateway device 181 is shared by four devices in the example shown. The bandwidth allocated to the subscriber gateway device 181 is also a portion of the available bandwidth provided by the headend node 150. The headend node 150 also provides bandwidth allocations to the subscriber gateway device 183, which services client device 195. Thus, in this example, the total bandwidth available from the headend node 150 is ultimately shared by five client devices 191, 192, 193a/b, 194 and 195. Those of ordinary skill in the art will appreciate from the present disclosure that, in various implementations, a headend node can be connected to any number and combination of gateway nodes and client devices, and FIG. 1 is merely an example provided to discuss aspects of various implementations.

In some implementations, a subscriber gateway device is configured to manage access and/or assist in the management of network resources available through the subscriber gateway device to corresponding client devices. To that end, for example, the subscriber gateway device 181 includes an analytics module 181a and a resource management module 181b. In the example shown in FIG. 1, the analytics module 181a and the resource management module 181b are provided, individually or in combination, to manage access or assist in the management of network resources available to the client devices 191, 192, 193a/b, and 194. In some implementations, each of the analytics module 181a and the resource management module 181b include one or more respective functions of the corresponding analytics modules 143, 152 and the resource management modules 144, 153 discussed above and below. Similarly, the subscriber gateway device 183 includes an analytics module 183a and a resource management module 183b.

With continued reference to FIG. 1, the content server 110 is configured to store and provide media content data. To that end, the content server 110 typically includes a non-transitory memory 111, a processor 115, an input-output (I/O) interface 116, and a network interface 117. The network interface 117 is configured to enable communication with other devices and systems, and for example, without limitation includes a modulator/demodulator (modem for communication with another device, system, or network), a radio frequency transceiver or another type of transceiver, a telephone interface, a bridge, a router, etc. In some implementations, the I/O interface 116 includes input devices, such as but not limited to, a keyboard, mouse, scanner, microphone, etc. The I/O interface 116 may also include output devices, such as but not limited to, a display, speakers, etc.

Figure 4:
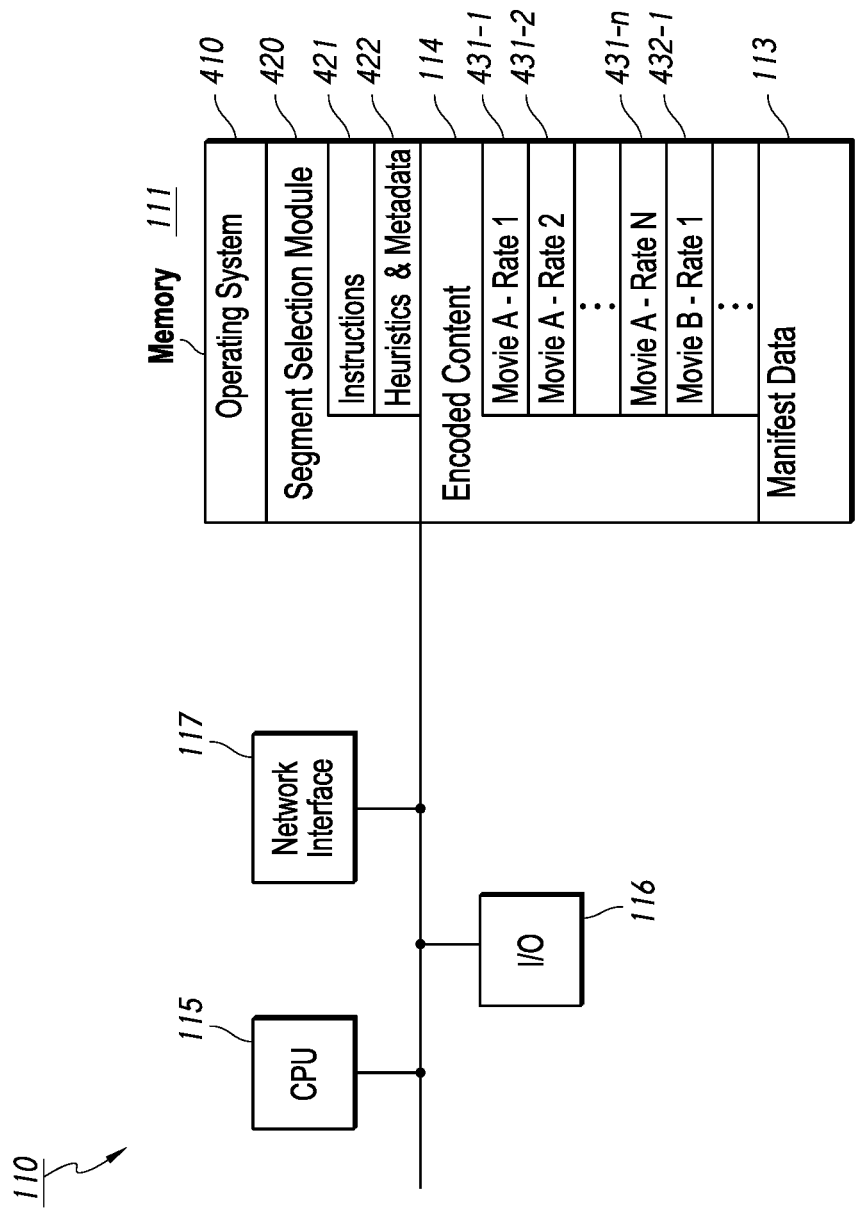
FIG. 4 is a block diagram of an example content server system in accordance with some implementations.

FIG. 4 is a block diagram of an example implementation of the content server system 110 of FIG. 1 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the content server system 110 includes one or more processing units (CPU's) 115, a network interface 117, a memory 111, and a local I/O interface 116. The memory 111 includes an operating system 410, which includes implementations of procedures for handling various basic system services and for performing hardware dependent tasks.

With reference to FIGS. 1 and 4, the memory 111 includes instructions 112 (421 in FIG. 4), a manifest 113 and encoded media content data 114. With reference to FIG. 1, in some implementations, the instructions 112 enable the selection of one or more encoding rate representations and/or one or more temporal segments of a media content data item in response to a request from a client device. With reference to FIG. 4, in some implementations the content server 110 also includes a segment selection module 420. The segment selection module 420 includes instructions 421 and heuristics and metadata 421. In some implementations, the instructions 421 in combination with the heuristics and metadata 421 enable the selection of one or more encoding rate representations and/or one or more temporal segments of a media content data item in response to a request from a client device. In some implementations, the encoded media content data 114 includes multiple representations of each of one or more media content data items. As an example, as shown in FIG. 4, the encoded media content data 114 includes data representing two movies, namely Movie A and Movie B, as example media content data items. Those of ordinary skill in the art will appreciate from the present disclosure that various other types of media content data include without limitation sports video, newscasts, music and concert videos, and various other types of TV programs, audio files and video games. Encoded content 114 includes multiple representations 431-1, 431-2, . . . , 431-n of Movie A, that are each encoded at a different bit rate than the other representations. Similarly, one of many representations of Movie B, indicated by 432-1, is also illustrated in furtherance of the example. In some implementations, a representation of a media content data item is temporally divided into one or more segments, each of which is available at one or more encoding rates. In some implementations, the manifest 113 includes metadata associated with each of the encoding rate representations and/or the segments of the one or more media content data items. For example, the manifest 113 includes at least one of a respective encoding rate indicator, a quality level indicator, and a duration indicator for each representation of the one or more media content data items. In some implementations, as described below with reference to FIG. 2, a quality level indicator is explicitly indicated (e.g., as opposed to being inferred from the encoding bit rate), with the explicit indication corresponding to a perceptual playback quality metric such as mean square error (MSE), peak signal-to-noise ratio (PSNR), mean opinion score (MOS), relative degradation, an encoding quantization parameter or other well-known quality metrics. In some implementations, a quality level indicator includes a respective QoE metric associated with a segment of a representation of a media content data item, characterized by a particular encoding rate. In other words, in some implementations, a manifest provides a content matrix searchable by one or more factors used to characterize segment representations. For example, metadata for each segment comprises one or more quality level metrics, encoding rate, segment duration, segment size (e.g., specified as a bit quantity, the number of bytes and/or average bitrate).

The cache server 130 is configured to provide replicas of at least some of the media content data and associated metadata stored and provided by the content server 110. In various implementations, the cache server 130 is similarly configured to the content server 110, and includes, without limitation, a processor 135, a non-transitory memory 131, a network interface 137, and I/O interface 136. In some implementations, a request for media content data item from a client device is initially directed to or redirected to the cache server 130, when the cache server 130 is closer to the client device than the content server 100. The cache server 130 can also be used to supplement the content server 110 during times of excessive traffic.

Although FIG. 1 illustrates a number of discrete elements, FIG. 1 is intended to highlight various aspects of a network rather than to serve as a schematic strictly indicative of various network implementations. Thus, in various implementations, a network includes a subset or superset of the elements illustrated in FIG. 1. As such, a combination of elements could be implemented by a single element and some singular elements could be implemented by one or more elements. The number of elements and how various features and functions are allocated can vary between implementations, and may depend in part on the amount of traffic a network is configured to handle during various usage periods (e.g., peak, average, low, etc.).

In operation, various encoding rate representations of media content data items can be provided to client devices (e.g., client device 191) in a number of ways. For example, in HTTP-based adaptive streaming (HAS) and in ABR-enabled systems, a media content item (e.g., a particular movie, sportscast, etc.) is typically sub-divided into temporal segments (e.g., 2-10 seconds long). Often each temporal segment is encoded at multiple bit rates in order to provide each temporal segment at different perceptual playback quality levels. To that end, multiple representations of each segment are stored and made available by the content server 110 to client devices. The encoding bit rate of each segment representation in part characterizes the perceptual playback quality of the segment representation. Since each representation of a segment is encoded at a different bit rate, each representation has a different amount of data, and thus uses a different combination of bandwidth and/or time for transmission. A variety of storage structures can be used for ABR media content data, such as directories with individual files for each segment, standardized file formats, and/or custom packaging schemes. In some implementations, the structure of the media content data, along with associated metadata associated with each segment, is contained in a separate structure, referred to above as a manifest (e.g., manifest data 113 in FIGS. 1 and 4). In some implementations, manifest data 113 also includes a respective quality level indicator that explicitly indicates the perceptual playback quality of each segment representation. More specifically, in some implementations, a quality level indicator provides a quantitative characterization of the perceptual playback quality of a segment representation for a client device that has the playback capability to achieve the indicated level of quality. As noted above, various quality level indicators include, without limitation, metrics such as mean square error (MSE), peak signal-to-noise ratio (PSNR), mean opinion score (MOS), relative degradation, an encoding quantization parameter or other well-known quality metrics.

An ABR-enabled client device selects and transmits a request (e.g., a HTTP GET command) for a specific segment representation from the content server 110. The selection decision is based on various parameters including the subscription tier bandwidth allocated to the client device and the amount of data currently residing in a playout buffer of the client device. Previously known ABR client device methods have a general bias towards enabling a client device to consume as much bandwidth as is available to the client device in order to increase utilization of bandwidth and/or other resources. In turn, an ABR-enabled client device typically operates to select segments representations with high encoding rates so that the client device consumes as much of the bandwidth allocated to it as possible. A typical ABR-enabled client device is also biased towards consuming bandwidth in excess of its subscription tier allocation when additional bandwidth becomes available from the network.

A drawback of these methods is that they do not consider or determine whether actual perceptual quality of experience improvements, if any, achieved by an ABR-enabled client device justify the bias towards consuming available bandwidth. For example, a client device may select a 10 Mbps representation of a video stream segment over a 6 Mbps representation of the same video stream segment. However, depending on the content of the video stream segment (e.g., a movie scene with fast moving action versus a scene with mainly dialogue and little movement), the end user may not perceive an appreciable difference in playback quality. Without such an appreciable difference, the additional 4 Mbps bandwidth (or equivalently time) used to receive the 10 Mbps segment representation is misused, and could be utilized more productively. Additionally, a specified level of perceptual playback quality for a segment representation is often based on the playback capability of a client device. So for example, a first client device may only be capable of displaying video at a resolution of 720p, while a second client device is capable displaying video at a resolution of 1080p. If the first client device is not prevented from selecting the higher rate representation (for 1080p), as would be the cased with an ABR-enabled client device, the first client device would effectively misuse or misappropriate bandwidth from the second client device and/or other client devices by selecting the higher rate representation.

By contrast, as provided by some implementations, a more effective use of available bandwidth includes limiting the first client device to a segment representation with a resolution of 720 p, because the difference in playback quality cannot be realized on the first client device. To that end, more generally, various implementations enable client devices to cooperatively participate in the allocation and consumption of the one or more network resources in order to produce more evenly distributed perceptual playback quality levels among client devices within each subscription tier. For example, some implementations include a method of jointly determining a respective resource allocation and a corresponding bit-rate representation selection for each of a plurality of client devices such that a combination of resulting quality levels for the plurality of client devices satisfies a joint quality criterion.

For example, first and second client devices are allocated respective bandwidth allocations over a shared link by a resource management module (e.g., resource management module 153). The first and second client devices are configured to operate within the respective bandwidth allocations, and are configured to request content streams at bit rates such that each stream does not exceed the respective bandwidth allocation. The first and second client devices are each initially assigned respective bandwidth allocations of 4 Mbps on a shared link having a total of 8 Mbps bandwidth. In furtherance of this example, the first client device is operating to receive a sports video stream (i.e., characterized by rapid pixel changes), and the second client device is operating to receive a newscast video stream (i.e., characterized by slow pixel changes). The sports video stream may be available at three bit rates, 8 Mbps stream with good quality video, 6 Mbps with acceptable quality video, and 4 Mbps stream with poor quality video. The newscast video stream may also be available in four bit rates, 8 Mbps stream with excellent quality video, 6 Mbps stream with excellent video quality (the 8 Mbps stream being insubstantially better than 6 Mbps stream in terms of quality), 4 Mbps stream with good quality video, and 2 Mbps with acceptable quality video. In accordance with some implementations, the first and second devices are provided with respective bandwidth allocations and segment representations (of the client selected media content) at network-selected encoding rate levels that satisfy a joint quality criterion for both the first and second devices.

Figure 2:
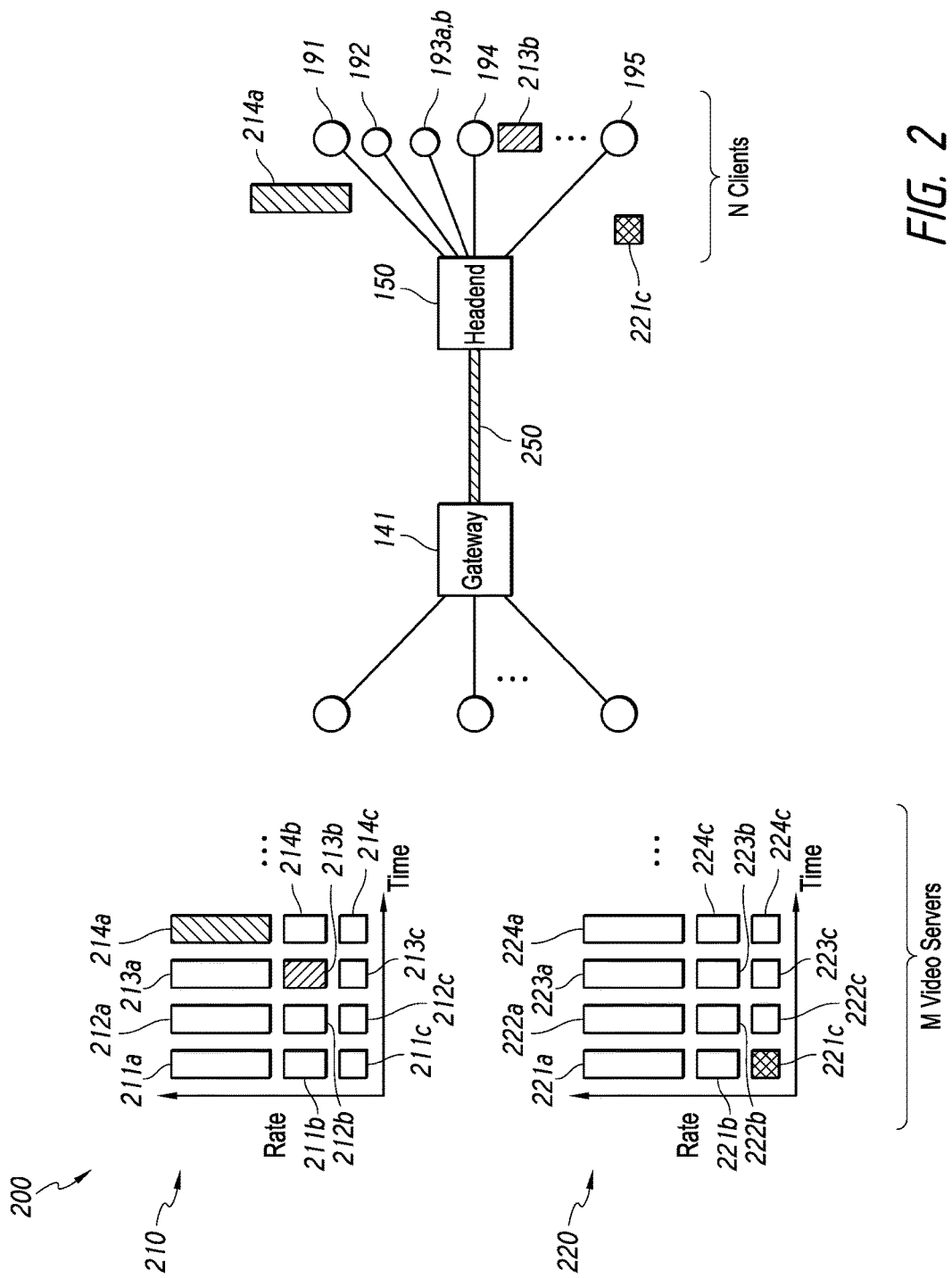
FIG. 2 is a block diagram of a data link congestion model in accordance with some implementations.

FIG. 2 is a block diagram of a data link congestion model 200 that further illustrates the issues described above. The data link congestion model 200 shown in FIG. 2 is similar to an adapted from the data communication environment 100 provided in FIG. 1. Elements common to FIGS. 1 and 2 include common reference numbers, and only the differences between FIGS. 1 and 2 are described herein for the sake of brevity. To that end, the congestion model 200 includes a bottleneck link 250 providing a shared allocation of bandwidth between the gateway node 141 and+ headend node 150. The headend node 150 is ultimately coupled to the five client devices 191, 192, 193*a/b*, 194 and 195. Thus, in this example, the total bandwidth available through the headend node 150 on bottleneck link 250 is ultimately shared by the five client devices 191, 192, 193*a/b*, 194 and 195.

The congestion model 200 in FIG. 2 also includes first and second media content data items 210, 220 stored at M video servers (not shown). The first media content data item 210 includes a first set of segment representations 211*a,b,c*, a second set of segment representations 212*a,b,c*, a third set of segment representations 213*a,b,c*, and a fourth set of segment representations 214*a,b,c*. The first set of segment representations 211*a,b,c* includes segment representations for a first temporal segment of the first media content data item 210. Similarly, the second, third and fourth sets of segment representations (212*a,b,c*, 213*a,b,c*, 214*a,b,c*) are for respective second, third and fourth temporal segments of the first media content data item 210. The second media content data item 220 includes a first set of segment representations 221*a,b,c*, a second set of segment representations 222*a,b,c*, a third set of segment representations 223*a,b,c*, and a fourth set of segment representations 224*a,b,c*. The first, second, third and fourth sets of segment representations (221*a,b,c*, 222*a,b,c*, 223*a,b,c*, 224*a,b,c*) are for respective first, second, third and fourth temporal segments of the second media content data item 220.

In operation, the five client devices 191, 192, 193*a/b*, 194 and 195 are each able to select segment representations. In some implementations, a client device selects a temporal segment based on a respective portion of the bandwidth on bottleneck link 250 allocated to the client device. For example, as shown in FIG. 2, the client device 191 selects segment representation 214a, corresponding to the highest encoding rate available for the fourth temporal segment of the first media content data item 210. The client device 194 selects segment representation 213b, corresponding to the middle encoding rate available for the third temporal segment of the first media content data item 210. And, the client device 195 selects segment representation 221c, corresponding to the middle encoding rate available for the third temporal segment of the second media content data item 220. Additionally, in ABR-enabled implementations, a client device is able to exceed the bandwidth allocated to it when other portions of the bandwidth on bottleneck link 250 are underutilized, and thus select segment representations with higher encoding rates that are normally supported by the bandwidth nominally allocation to the client device.

Client devices generally include any suitable computing device, such as a computer, a laptop computer, a tablet device, a netbook, an internet kiosk, a personal digital assistant, a mobile phone, a smartphone, a gaming device, a computer server, etc. In some implementations, each client device includes one or more processors, one or more types of memory, a display and/or other user interface components such as a keyboard, a touch screen display, a mouse, a track-pad, a digital camera and/or any number of supplemental devices to add functionality. As an example, FIG. 3, a block diagram of a configuration of a client device 300 in accordance with some implementations. While pertinent features are illustrated, those of ordinary skill in the art will appreciate from the present disclosure that various other features have not been illustrated for the sake of brevity and so as not to obscure more pertinent aspects of the example implementations disclosed herein.

In some implementations, the client device includes a suitable combination of hardware, software and firmware configured to provide at least some of protocol processing, modulation, demodulation, data buffering, power control, routing, switching, clock recovery, amplification, decoding, and error control. In some implementations, at least a portion of the control module and at least a portion of the plurality of optical communication devices are provided on a first substrate. For example, the client device 300 includes a communication interface 302. In some implementations, the communication interface 302 is suitable for communication over, among others, an IP network, a coaxial cable network, an HFC network, and/or wireless network. The communication interface 302 is coupled to a demultiplexer (demux) 304. The demux 304 is configured to parse the metadata (e.g., in the packet header or in the manifest) of segment representations and the body or payload data of the same. Metadata includes, for example, timestamp information, packet identifiers, program numbers, quality level, and/or other information useful for decoding and utilizing a received segment representation. The segment data and metadata information is provided to a media engine 306 as explained further below.

Although client device 300 is described in the context of various internet video streaming implementations, such as IPTV and VoD, the client device 300 may comprise additional and/or different components in various other implementations. For instance, in some implementations, the client device 300 includes a tuner system (e.g., radio frequency tuning, not shown) coupled to communication interface 302. In some implementations, a tuner system includes one or more tuners for receiving transport streams received via communication interface 302. Additionally and/or alternatively, in some implementations, a demodulator is employed to demodulate the received carrier signal and the demux 304 is configured to parse the transport stream packets of one or more defined carrier frequencies.

Figure 3:
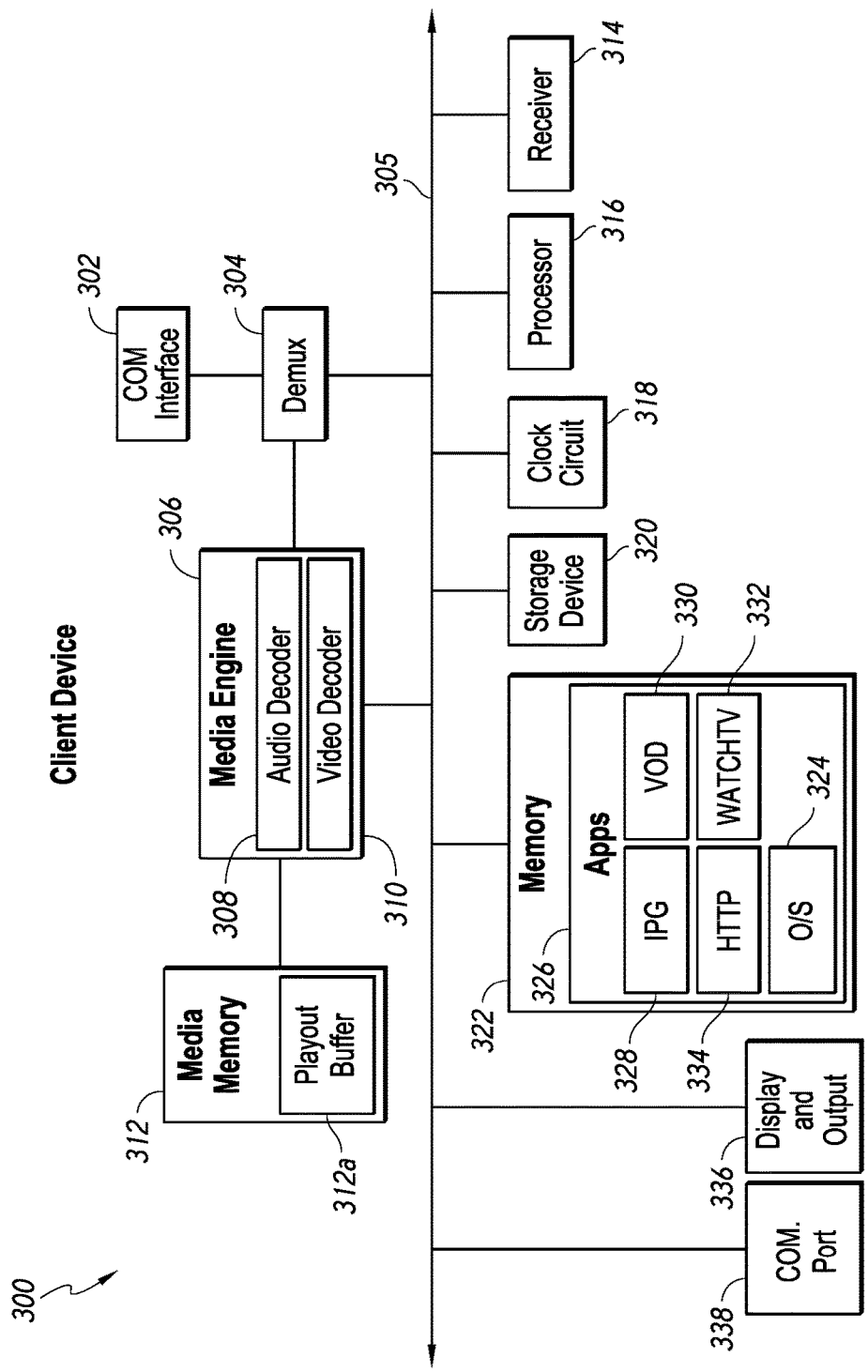
FIG. 3 is a block diagram of an example of a client device in accordance with some implementations.

As shown in FIG. 3, the demux 304 is coupled to a bus 305 and to media engine 306 (i.e. an audio/video (A/V) processing or decoding device). The media engine 306 includes decoding logic including, for example, at least one of an audio decoder 308 and a video decoder 310. The media engine 306 also includes buffer management functionality to facilitate a determination as to current buffer level within the client device 300. The media engine 306 is further coupled to bus 305 and to a media memory 312. The media memory 312 includes one or more buffers (e.g. playout buffers) for temporarily storing compressed and/or reconstructed pictures and/or audio frames. In some implementations, the buffers of media memory 312 and/or other buffers (e.g., network buffers) reside in other memory devices, or distributed among media memory 312 and memory 322.

In some implementations, the client device 300 includes additional components coupled to bus 305. For example, the client device 300 also includes a receiver 314 configured to receive user input. In some implementations, the client device 300 includes a processor 316 for executing and managing operations of the client device 300. In some implementations, the client device 300 includes a clock circuit 318 comprising phase and/or frequency locked-loop circuitry (or software, or combination of hardware and software) configured to synchronize clock information received in an audio, video, or A/V stream to facilitate decoding operations and to clock the output of reconstructed audiovisual content.

In some implementations, the client device 300 also includes a storage device 320 (and associated control logic) provided to temporarily store buffered content and/or to more permanently store recorded content. The memory 322 includes at least one of volatile and/or non-volatile memory, and is configured to store executable instructions or computer code associated with an operating system (O/S) 324, one or more applications 326 (e.g., an interactive programming guide (IPG) 328, a video-on-demand (VoD) app 330, a WatchTV app 332 (associated with broadcast network TV), HTTP logic 334, among other applications such as pay-per-view, music, personal video recording (PVR), driver software, etc. In some implementations, profile selection logic includes HTTP client functionality, and may generate requests for segment representation from a content server (e.g., content server 110).

The client device 300 may be further configured with display and output logic 336, as indicated above that may include graphics and video processing pipelines, among other circuitry to process the decoded pictures and associated audio and provide for presentation (e.g., display) on, or associated with, a display device or other media device. Communications port 338 (or ports) may further be included in the client device 300 for receiving information from and transmitting information to other devices. For instance, communication port 338 may feature USB (Universal Serial Bus), Ethernet, IEEE-1394, serial, and/or parallel ports, etc. In addition, communications port 338 may be configured for home networks (e.g., HPNA/MoCA, etc.). The client device 300 may also include an analog video input port for receiving analog video signals.

Figure 5:
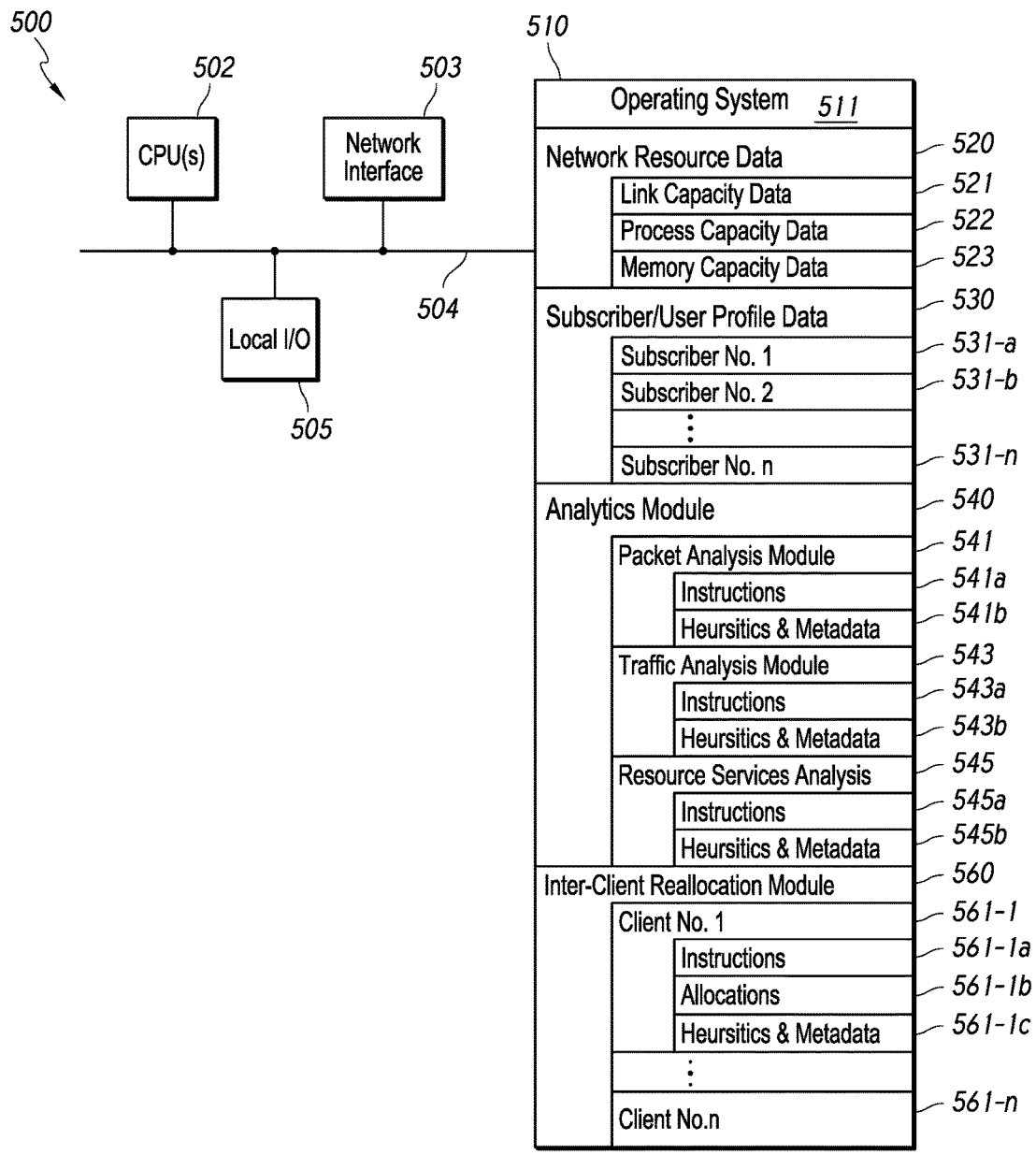
FIG. 5 is a block diagram of an example of a network resource management system in accordance with some implementations.

FIG. 5 is a block diagram of an example of a resource management system 500 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. As a non-limiting example, in some implementations the resource management system 500 includes one or more processing units (CPU's) 502, network interface 503, memory 510, local I/O interface 505, and one or more communication buses 504 interconnecting the aforementioned and other components.

In some implementations, the communication buses 504 include circuitry that interconnects and controls communications between system components. The memory 510 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 510 optionally includes one or more storage devices remotely located from the CPU(s) 502. The memory 510 comprises a non-transitory computer readable storage medium. Moreover, in some implementations, the memory 510 or the non-transitory computer readable storage medium of the memory 510 stores the following programs, modules and data structures, or a subset thereof including an optional operating system 511, network resource data 520, subscriber/user profile data 530, an analytics module 540, and an inter-client reallocation module 560.

The operating system 511 includes procedures for handling various basic system services and for performing hardware dependent tasks.

In some implementations, the network resource data 520 includes data associated with one or more shared network resources (e.g., bandwidth, processor time, memory, etc.). For example, as shown in FIG. 5, in some implementations, the network resource data 520 includes link capacity data 521, processor capacity data 522, and memory capacity data 523. In some implementations, the subscriber/user profile data 530 includes data associated with one or more subscriber gateway devices and/or subscriber client devices. For example, in some implementations, the subscriber/user profile data 530 includes subscriber policy limits for various client devices 531-a, 531b, . . . , 531-n. In some implementations, the subscriber policy limits and the like include the various levels of service that define a subscription tier model. For example, service levels define priority tiers, data throughput ranges, data throughput floors or ceilings, and degradation policies associated with the subscription tier model.

In some implementations, the analytics module 540 is configured to obtain client device segment representation selections, associated perceptual playback quality values, and one or more device resource constraints for each of the client devices sharing the one or more shared network resources as described above. As shown in FIG. 5, the analytics module 540 includes a packet analysis module 541, a traffic analysis module 543, and a resource services analysis module 545. In some implementations, the packet analysis module 541 is configured to perform deep packet inspection of packets sent to and/or from client devices in order to determine at least one of client device segment representation selections, encoding rates of segment representations, and QoE indicator values. To that end, the packet analysis module 541 includes instructions 541a, and heuristics and metadata 541b. In some implementations, the traffic analysis module 543 is configured to monitor network traffic to and/or from client devices in order to generate resource allocation utilization values for corresponding client devices and/or subscriber gateways. Additionally and/or alternatively, in some implementations, the traffic analysis module 543 is configured to request and receive resource allocation utilization values from at least some client devices and/or subscriber gateways. To that end, the traffic analysis module 543 includes instructions 543a, and heuristics and metadata 543b. In some implementations, the resource services analysis module 545 is configured to determine relative resource utilization values for resource allocations provided for corresponding services. To that end, the resource services analysis module 545 includes instructions 545a, and heuristics and metadata 545b.

In some implementations, the inter-client reallocation module 560 is configured to manage the reallocation of network resources between two or more groups of client devices and/or groups of subscriber gateway devices as described below with reference to FIGS. 7-10. In some implementations, the inter-client reallocation module 560 includes a sub-module to manage each of the two or more groups of client devices and/or groups of subscriber gateway devices. For example, as shown in FIG. 5, the inter-client reallocation module 560 includes client device sub-modules 561-1, . . . , 561-n. Each client device sub-module includes instructions, resource allocation data and/or heuristics and metadata. For example, the first client device sub-module 561-1 includes instructions 561-1a, allocation data 561-1b, and heuristics and metadata 561-1c.

In some implementations, the resource management system 500 includes logic configured to align sequences of one or more temporal segments, wherein each sequence is associated with one of a plurality of client devices sharing a network resource, and the one or more temporal segments of each sequence are used to provide segment representations of media content data to one of the plurality of client devices. In various implementations, such logic is implemented by a suitable combination of hardware, software and firmware. In some implementations, the resource management system 500 includes logic configured to select segment representations for each temporal segment, for each sequence, based on a combination of the sequence alignment and perceptual quality level values associated with available segment representations, wherein a combination of resulting perceptual quality levels satisfies a joint quality criterion across the sequences. In various implementations, such logic is implemented by a suitable combination of hardware, software and firmware. In some implementations, the resource management system 500 includes an interface (e.g., network interface 503) to the shared network resource configured to meter a respective allocation of the shared network resource provided to each of the plurality of client devices based on the alignment of sequences and selected segment representations.

With further reference to the data link congestion model 200 of FIG. 2, aspects of an example implementation are described and generalized hereinafter in the context of cable networks. As described above, the headend node 150 manages access to the bottleneck link 250 for a number of client devices 191, 192, 193a/b, 194 and 195. In many cable networks, a headend node is configured to deliver cable TV, cable modem services and/or various other data services to multiple homes (i.e., client sites) that each include a respective cable modem. Within each home, a portion of the bottleneck link at the ingress of the cable modem is often further shared among multiple HTTP video streams, bearing different content for various devices.

As noted above, in previously available systems, an ABR-enabled client device operates independent of others, and is generally biased towards consuming as much bandwidth as is available to it without regard to actual quality of experience improvements. Co-pending U.S. patent application Ser. No. 13/943,445, filed Jul. 16, 2013, entitled "Quality Optimization with Buffer and Horizon Constraints in Adaptive Streaming" presents a method described as Dynamic Programming, which is incorporated by reference in its entirety. In some implementations, the dynamic programming method enables an ABR-enabled client device to select segment representations at particular encoding bitrates in a manner that more efficiently uses bandwidth. For example, determining the encoding bitrate for a video segment is based on an estimate of current available network bandwidth C, constraints of a client device playout buffer in which video segments are stored, and also quality scores $Q_{i,m}$ associated with segments within a time horizon T extending from the current segment to a future segment in the video stream at an endpoint of the time horizon T.

More specifically, as disclosed by U.S. patent application Ser. No. 13/943,445, in some implementations, the dynamic programming method determines selections of segment representations for a single client device (i.e., the $i^{th}$ client device) for corresponding temporal segments of the time horizon T. At time t, the $i^{th}$ stream (i.e., for the $i^{th}$ client device) is assigned a bandwidth allocation of $c_{i,t}$. The determination of the bandwidth allocations $\{c_{i,t}\}$ assigned to each of the client devices and/or streams is described in greater detail below with reference to FIG. 8. In some implementations, as shown in equation (1) below, the summation of bandwidth allocations $\{c_{i,t}\}$ assigned to all streams is constrained to remain below the capacity C of the bottleneck link 250 of FIG. 2.

$$\Sigma_i c_{i,t} < C, \forall t \qquad (1)$$

For each segment representation, there are K different available encoding bit-rate segment representations associated with different quality levels. For notational convenience, a segment representation duration is denoted by $\tau$. The set of available rates $R_{i,m}$ for the $m^{th}$ segment representations for the $i^{th}$ client is provided by equation (2) as follows:

$$R_{i,m} = \{r_{i,m}^{(1)}, \ldots r_{i,m}^{(k)}, \ldots r_{i,m}^{(K)}\} \qquad (2)$$

A respective set of video quality values $Q_{i,m}$ corresponding to the set of available rates $R_{i,m}$ for the $m^{th}$ segment representations is provided by equation (3) as follows:

$$Q_{i,m} = \{q_{i,m}^{(1)}, \ldots q_{i,m}^{(k)}, \ldots q_{i,m}^{(K)}\} \qquad (3)$$

In some implementations, mean-square error (MSE) distortion is used to characterize the video quality metric because MSE distortion is often mathematically tractable. In some implementations, improving video quality Q is correlated with reducing MSE distortion D. However, in various implementations, the disclosed framework is general enough to accommodate other video quality metrics, including peak-signal-to-noise-ratio (PSNR), structure-similarity-index, and subjective mean opinion-score (MOS). Accordingly, those of ordinary skill in the art will appreciate that an implementation based on reducing MSE distortion is described herein merely for the sake of example.

In some implementations, jointly selecting segment representations on behalf of multiple ABR-enabled clients using an extension of dynamic programming facilitate a more efficient use of bandwidth shared by a number of ABR-enabled client devices. However, even though implementations of dynamic programming described in U.S. patent application Ser. No. 13/943,445 provide a robust solution for a single ABR-enabled client device, there are some challenges in extending dynamic programming based selection for jointly selecting segment representations on behalf of multiple ABR-enabled clients. First, dynamic programming as described in U.S. patent application Ser. No. 13/943,445 enables the selection of segment representations at particular encoding bitrates for a single client device. Additionally, in some implementations involving N client devices sharing bandwidth C, it is also desirable to determine bandwidth allocations, $\{c_{i,t}\}$ for $\forall i$, i=1, . . . , N, for each of the N client devices. Second, in some implementations, the computational complexity of dynamic programming tends to increase exponentially when extended from a single-client method to a multi-client method. The computational complexity increases exponentially, in part, because the buffer state space becomes N-dimensional for N client devices. Computational complexity also increases, in part, because temporal segments, within the time horizon T, during which corresponding segment representations are provided to the client devices are not time aligned. In other words, the downloading of segment representations, by multiple client devices that share bandwidth, are not temporally aligned because conventional ABR-enabled client devices are permitted to operate independently of one another.

Figure 6:
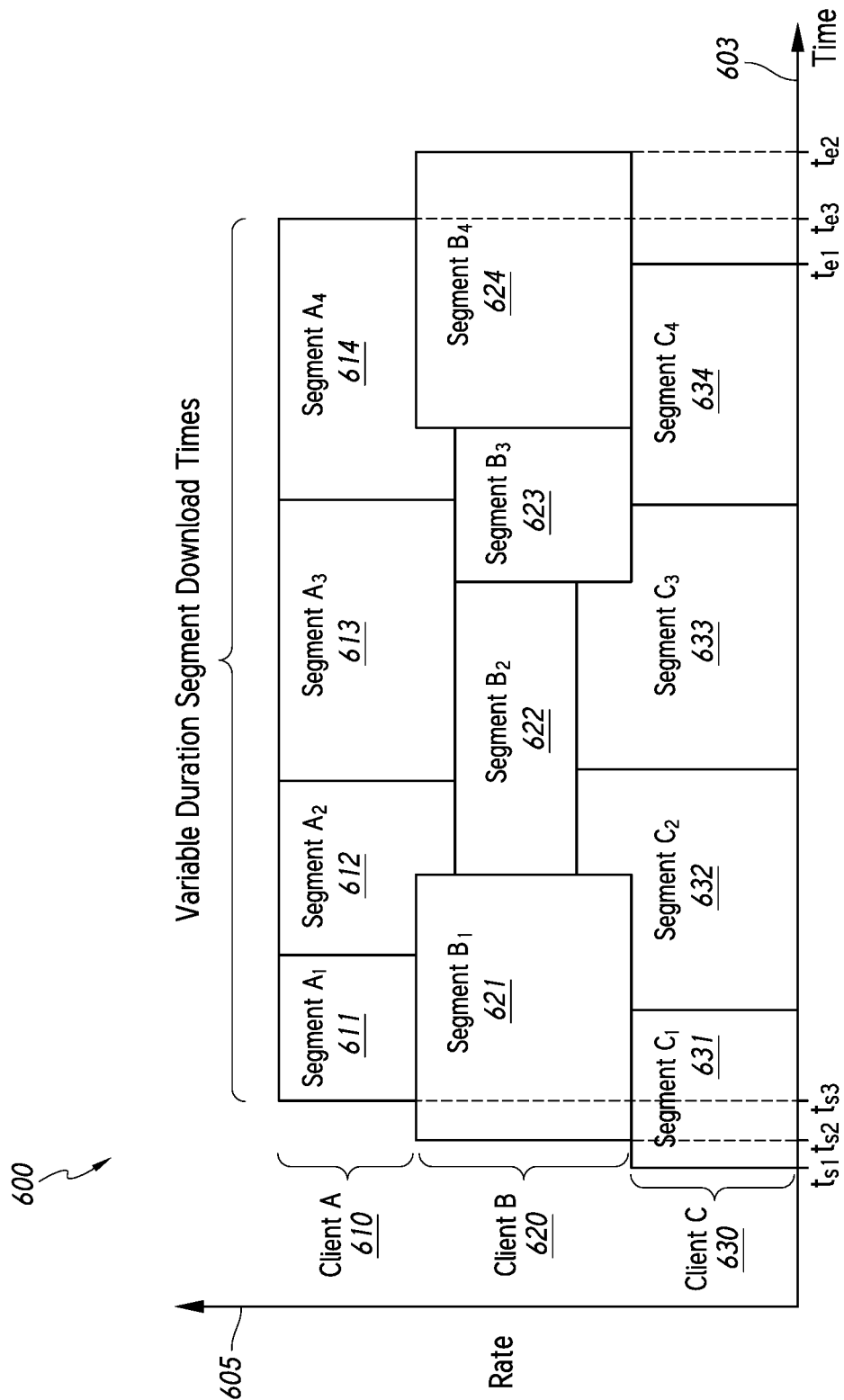
FIG. 6 is a time and encoding rate diagram of segment representations of media content data selected by a number of client devices according to some implementations.

FIG. 6 is a time and encoding rate diagram 600 of segment representations selected by a number of client devices 610, 620, 630 (i.e., client A, client B, and client C), which illustrates the aforementioned temporal misalignment. The independent axis 603 of the time and encoding rate diagram 600 represents the downloading time of independent streams of segment representations selected by the client devices 610, 620, 630. The dependent axis 605 of the time and encoding rate diagram 600 represents the cumulative encoding rate of segment representations selected by the client devices 610, 620, 630 for the respective streams.

Client C (630), for example, selects four segment representations 631, 632, 633, 634 (i.e., segments $C_1$, $C_2$, $C_3$, $C_4$) in a first stream. The first stream of segments $C_1$, $C_2$, $C_3$, $C_4$ starts at $t_{s1}$ and ends at $t_{e1}$, with the intervening segment start and end times for the individual segments $C_1$, $C_2$, $C_3$, $C_4$ occurring at arbitrary times that are dependent on the segment selections made by Client C (630). Similarly, Client B (620), for example, selects four segment representations 621, 622, 623, 624 (i.e., segments $B_1$, $B_2$, $B_3$, $B_4$) in a second stream. The second stream of segments $B_1$, $B_2$, $B_3$, $B_4$ starts at $t_{s2}(\neq t_{s1})$ and ends at $t_{e2}$ ($\neq t_{e1}$), with the intervening segment start and end times for the individual segments $B_1$, $B_2$, $B_3$, $B_4$ occurring at arbitrary times that are dependent on the segment selections made by Client B (620) and misaligned with respect to start and end times of segments $C_1$, $C_2$, $C_3$, $C_4$. Client A (610) also selects four segment representations 611, 612, 613, 614 (i.e., segments $A_1$, $A_2$, $A_3$, $A_4$) in a third stream. The third stream of segments $A_1$, $A_2$, $A_3$, $A_4$ starts at $t_{s3}(\neq t_{s1}$ or $t_{s2})$ and ends at $t_{e2}(\neq t_{e1}$ or $t_{e3})$, with the intervening segment start and end times for the individual segments $A_1$, $A_2$, $A_3$, $A_4$ occurring at arbitrary times that are dependent on the segment selections made by Client A (610) and misaligned with respect to start and end times of segments $C_1$, $C_2$, $C_3$, $C_4$ and $B_1$, $B_2$, $B_3$, $B_4$.

In some implementations, in order to limit the computational complexity, of a multi-client dynamic programming method of selecting segment representations for multiple streams, sequences of one or more temporal segments are temporally aligned. Each sequence is selected for and associated with one of a number of client devices sharing a network resource (e.g., bandwidth), and the one or more temporal segments of each sequence are used to provide segment representations of media content data that is provided to a respective one of the client devices. For example, with reference to FIG. 2, in some implementations, the headend node 150 is configured to control the service rate to each cable modem. In some implementations, the headend node 150 is configured to make per-stream segment representation selections decisions for a number of client device and cable modem combinations in a centralized manner using a time aligned dynamic programming in a centralized manner. Additionally, in some implementations, as described below with reference to FIGS. 8 and 9, segment representations for each temporal segment are selected based on a combination of the sequence alignment and perceptual quality level values associated with available segment representations, such that a combination of resulting perceptual quality levels satisfies a joint quality criterion. As described below, in some implementations, sequence alignment includes a combination of aligning start and/or end times of segments across a number of client streams (i.e., sequences of segments), adjusting respective data sizes for segments across a number of client streams, and limiting and/or shaping respective rates and/or bandwidth provided to each of one or more client devices.

Figure 7:
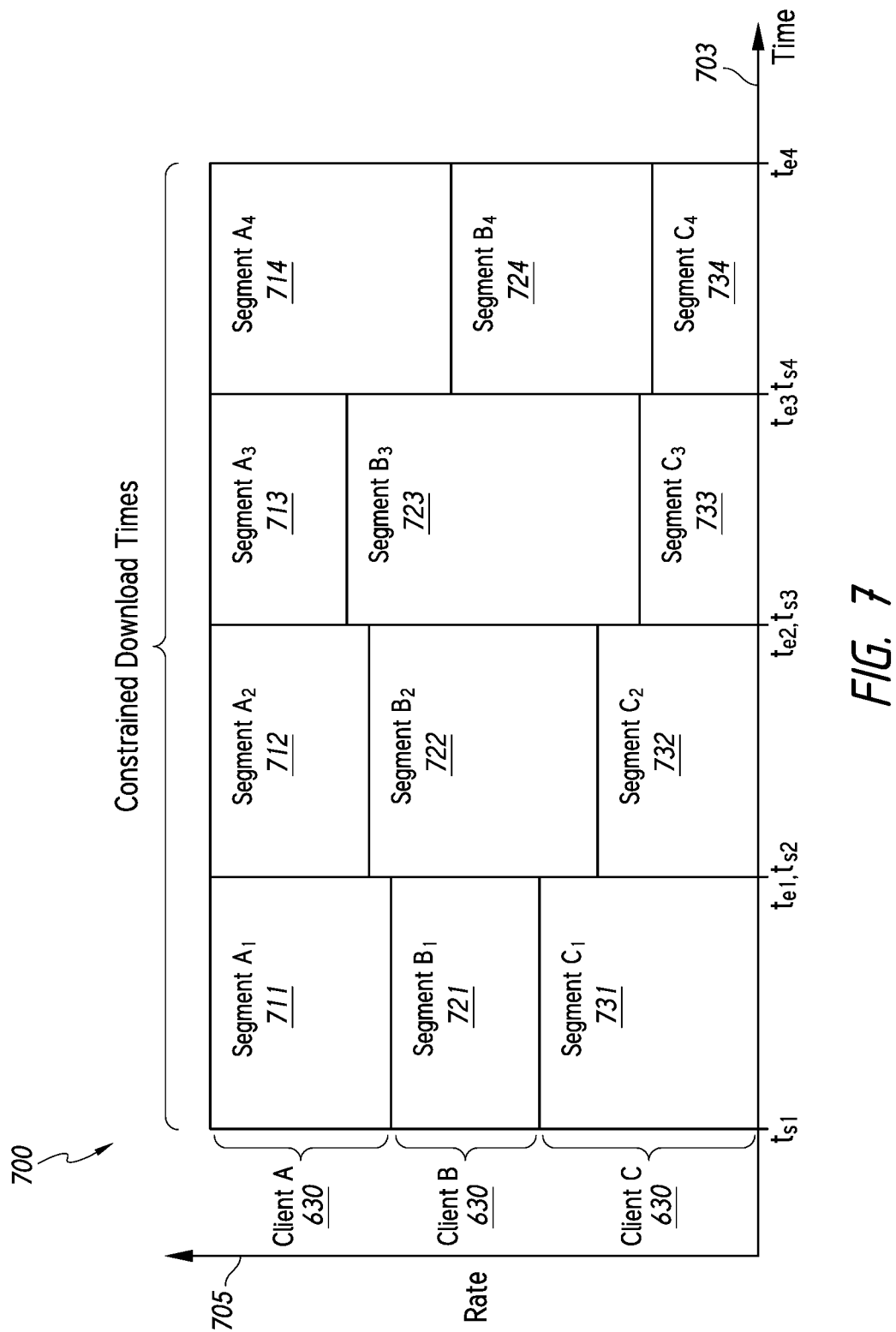
FIG. 7 is a time and encoding rate diagram of segment representations of media content data selected for a number of client devices according to some implementations.

FIG. 7 is a time and encoding rate diagram 700 of segment representations selected for the client devices 610, 620, 630 (i.e., client A, client B, and client C), which illustrates the aforementioned temporal alignment in accordance with some implementations. The independent axis 703 of the time and encoding rate diagram 700 represents the downloading time of independent streams of segment representations selected for the client devices 610, 620, 630. The dependent axis 705 of the time and encoding rate diagram 700 represents the cumulative encoding rate of segment representations selected for the client devices 610, 620, 630 for the respective streams.

More specifically, four respective segment representations 731, 732, 733, 734 (i.e., segments $C_1$, $C_2$, $C_3$, $C_4$) are selected for a first stream provided to Client C (630). Similarly, four respective segment representations 721, 722, 723, 724 (i.e., segments $B_1$, $B_2$, $B_3$, $B_4$) are selected for a second stream provided to Client B (620), and four respective segment representations 711, 712, 713, 714 (i.e., segments $A_1$, $A_2$, $A_3$, $A_4$) are selected for a third stream provided to Client A (610). In some implementations, each of the three streams starts at a common start time $t_{s1}$, and ends at a common end time $t_{e4}$. In some implementations, the common start time $t_{s1}$ and the common end time $t_{e4}$ define a time horizon T. Moreover, the intervening segment start and end times $t_{e1}$, $t_{s2}$, $t_{e2}$, $t_{s3}$, $t_{e3}$, $t_{s4}$ are also time aligned across the three streams as shown in FIG. 7. In some implementations, at least one of the start and end times for one or more streams falls within a threshold variance of a corresponding start time and a corresponding end time.

Additionally and/or alternatively, in some implementations, in order to limit the computational complexity, of a multi-client dynamic programming method of selecting segment representations for multiple streams, the initial buffer levels of respective playout buffers associated with the N client devices are constrained such that each initial buffer level is substantially the same as the others. In some implementations, each of the initial buffer levels falls within a threshold variance of a common initial buffer level. Consequently, in such implementations, an N-dimensional buffer state space for N client devices can be relatively accurately approximated by tracking the evolution of a one-dimensional buffer state space.

Figure 8:
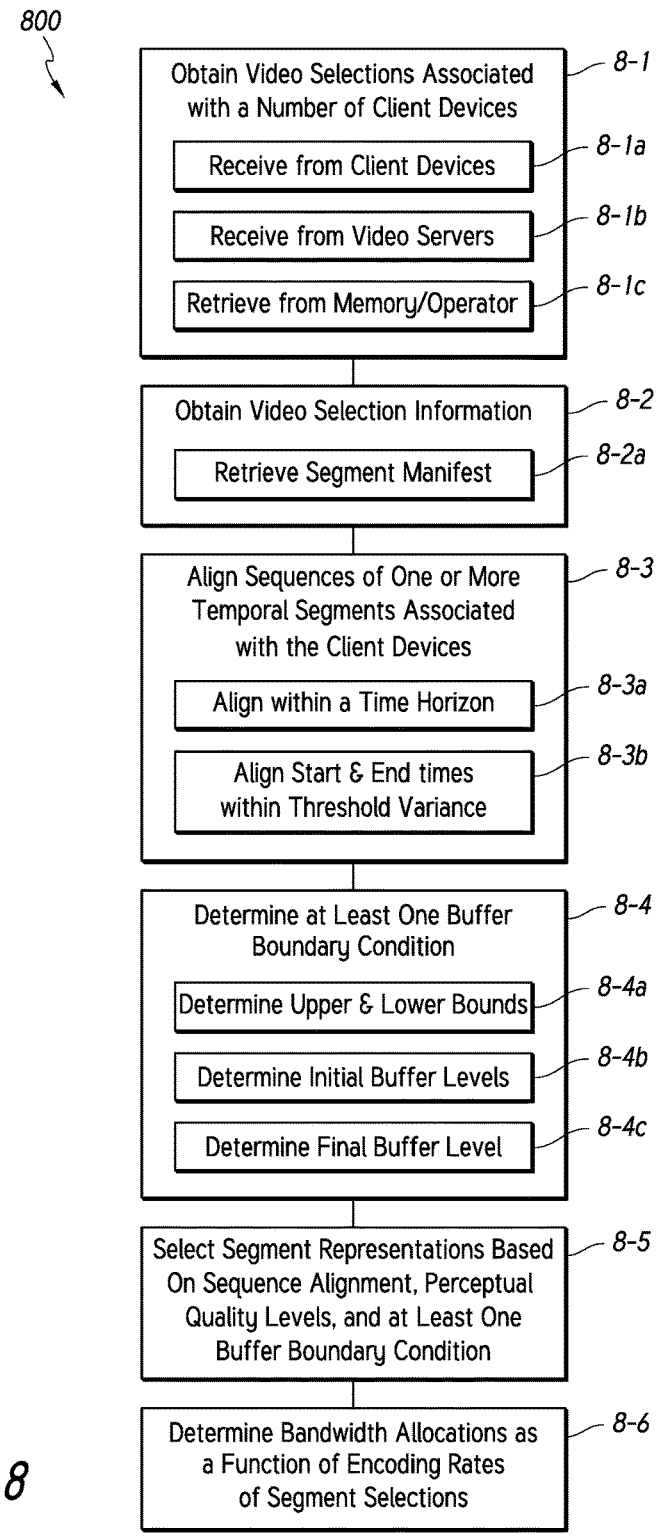
FIG. 8 is a flowchart representation of a method of joint quality management across multiple devices in accordance with some implementations.

FIG. 8 is a flowchart representation of a method 800 of quality management across multiple devices in accordance with some implementations. In some implementations, the method 800 is performed by a resource management module associated with a network administration node (e.g., network administration node 142) and/or a resource bottleneck node (e.g., headend node 150 etc.). Briefly, the method 800 includes aligning sequences of one or more temporal segments, and selecting segment representations for each temporal segment based on a combination of sequence alignment and perceptual quality level values associated with available segment representations, such that a combination of resulting perceptual quality levels satisfies a joint quality criterion. Each sequence is associated with one of a number of client devices (or independent streams) sharing a network resource (e.g., bandwidth, memory, processor time, etc.). The one or more temporal segments of each sequence are used to provide segment representations of media content data to one of the client devices.

To that end, as represented by block 8-1, the method 800 includes obtaining video selections from N client devices sharing the aggregate available capacity C. For example, in some implementations, as represented by block 8-1a, obtaining video selections includes querying and receiving indications of the video selections from the client devices. In some implementations, as represented by block 8-1b, obtaining video selections includes querying and receiving indications of the video selections from one or more video servers. In some implementations, as represented by block 8-1c, obtaining video selections includes retrieving indications of the video selections from a non-transitory memory. As represented by block 8-2, the method 800 includes obtaining video selection information associated with each of the video selections. For example, as represented by block 8-2a obtaining video selection information includes retrieving a manifest file and/or manifest data stored in a non-transitory memory. More generally, the method includes obtaining media content selection information associated with each of the N client devices. In some implementations, media content selection information includes one or more perceptual quality level values that are correspondingly associated one or more encoding rates of one or more segment representations available during a temporal segment for particular media content data.

As represented by block 8-3, the method 800 includes aligning sequences of one or more temporal segments associated with the N client devices. In other words, the method 800 includes aligning N sequences of one or more temporal segments, where each sequence is associated with one of the N client devices sharing a network resource, and the one or more temporal segments of each sequence are used to provide segment representations of media content data to one of the N client devices. In some implementations, as represented by block 8-3a, the N sequences correspondingly associated with the N client devices are aligned within a time horizon T that includes at least one temporal segment. In some implementations, as represented by block 8-3b, aligning the respective N sequences includes temporally aligning the start and end times of at least portions of the respective sequences within a threshold variance. In some implementations, sequence alignment includes a combination of aligning start and/or end times of segments across a number of client streams (i.e., sequences of segments), adjusting respective data sizes for segments across a number of client streams, and limiting and/or shaping an available aggregate rate or bandwidth.

As represented by block 8-4, the method 800 includes determining at least one buffer boundary condition that characterizes an aggregate limiting rate at which segment representations can be provided to the N client devices during each temporal segment. For example, as represented by block 8-4a, the at least one buffer boundary condition includes at least one of a lower bound $B_L$ provided to reduce playout buffer underflow by at least one of the N client devices, and an upper bound $B_H$ characterizing an aggregate data rate shared by the N client devices using shared network resource. As represented by block 8-4b, determining at least one buffer boundary condition includes obtaining an initial buffer level value $\{B_0\}$ for each of the N client devices, wherein each initial buffer level value characterizes a limiting rate at which media content data can be provided to a particular client device. In some implementations, the method further includes setting the initial buffer level values $\{B_0\}$ to be substantially the same and/or within a threshold variance of one another by providing instructions to the various client devices. As represented by block 8-4c, determining at least one buffer boundary condition includes obtaining a final buffer level value $B_{end}$ associated with each of the N client devices. In some implementations, the final buffer level value $B_{end}$ characterizes the utilization of respective playout buffers correspondingly associated with the N client devices at the end of a final temporal segment within the time horizon T. Utilization of the various buffer boundary conditions (i.e., $B_0$, $B_L$, $B_H$, $B_{end}$) are described in greater detail with reference to FIGS. 9 and 10 below.

As represented by block 8-5, the method 800 includes selecting segment representations for each temporal segment based on a combination of the sequence alignment and perceptual quality level values associated with available segment representations, wherein a combination of resulting perceptual quality levels satisfies a joint quality criterion. In some implementations, selecting segment representations is also based on the at least one buffer boundary condition, as described below with reference to FIGS. 9 and 10. In some implementations, Also as described below with reference to FIGS. 9 and 10, dynamic programming is used to determine the segment representation selections for the temporal segments. To that end, at least one segment representation is selected for each temporal segment associated with each of the N client devices using dynamic programming as described below with reference to FIG. 10. Additionally and/or alternatively, in some instances two or more segment representations are optionally scheduled within a single temporal segment associated with a particular one of the N client devices. The option to schedule two or more segment representations within one temporal segment enables a resource management module to accommodate a client device that has a playout buffer level lower than a threshold provided to indicate a risk of buffer underflow. To that end, in some implementations, selecting segment representations for a temporal segment includes obtaining an indicator that a respective playout buffer level associated with a particular one of the N client devices has breached a lower threshold, and then selecting two or more segment representations for a single temporal segment associated with the particular client device in response to obtaining the indicator. In some implementations, selecting segment representations includes: allocating respective bit allocations to each of the plurality of client device based on marginal utility ranking associated with the segment representations, wherein the summation of the respective bit allocations are bound by a corresponding total bit allocation per temporal segment; producing a vector of quality values corresponding to the corresponding total bit allocation per temporal segment; aggregating bit allocations per temporal segment; and selecting one or more segment representations for each of the plurality of client devices at particular encoding rates that satisfy a joint distortion performance value for the aggregated bit allocations.

As represented by block 8-6, the method 800 includes determining the bandwidth allocations $\{c_{i,t}\}$ for the N client devices on a temporal segment basis as a function of the encoding bitrates $\{r_{i,t}\}$ of the selected segment representations. In other words, the respective rates $\{r_{i,t}\}$ of the segment representations correspondingly chosen for the N client devices are used to allocate bandwidth during each temporal segment with the time horizon T. In some implementations, the allocated bandwidth (i.e., service rate) for the $m^{th}$ segment for the $i^{th}$ client device is provided by equation (4) as follows:

$$c_{i,m} = C \cdot \left( \frac{r_{i,m}}{\sum_i r_{i,m}} \right) \quad (4)$$

More generally, the method 800 includes determining a respective allocation of the shared network resource (e.g., bandwidth, memory, processor time, etc.) provided to each of the N client devices. The respective allocation of the shared network resource provided to a particular client device during a particular temporal segment is a function of an encoding rate of one or more segment representations correspondingly selected for the particular temporal segment for the particular client device. Additionally, the download time $T_m$ for the $m^{th}$ segments for the N client devices can be approximated by equation (5) as follows:

$$T_m = C \cdot \left( \frac{1}{\sum_i r_{i,m}} \right) \quad (5)$$

Moreover, the playout buffer level for a representative client device evolves in accordance with equation (6) as follows:

$$b_m = b_{m-1} + 1 - C \cdot \left( \frac{1}{\sum_i r_{i,m}} \right) \quad (6)$$

Figure 9:
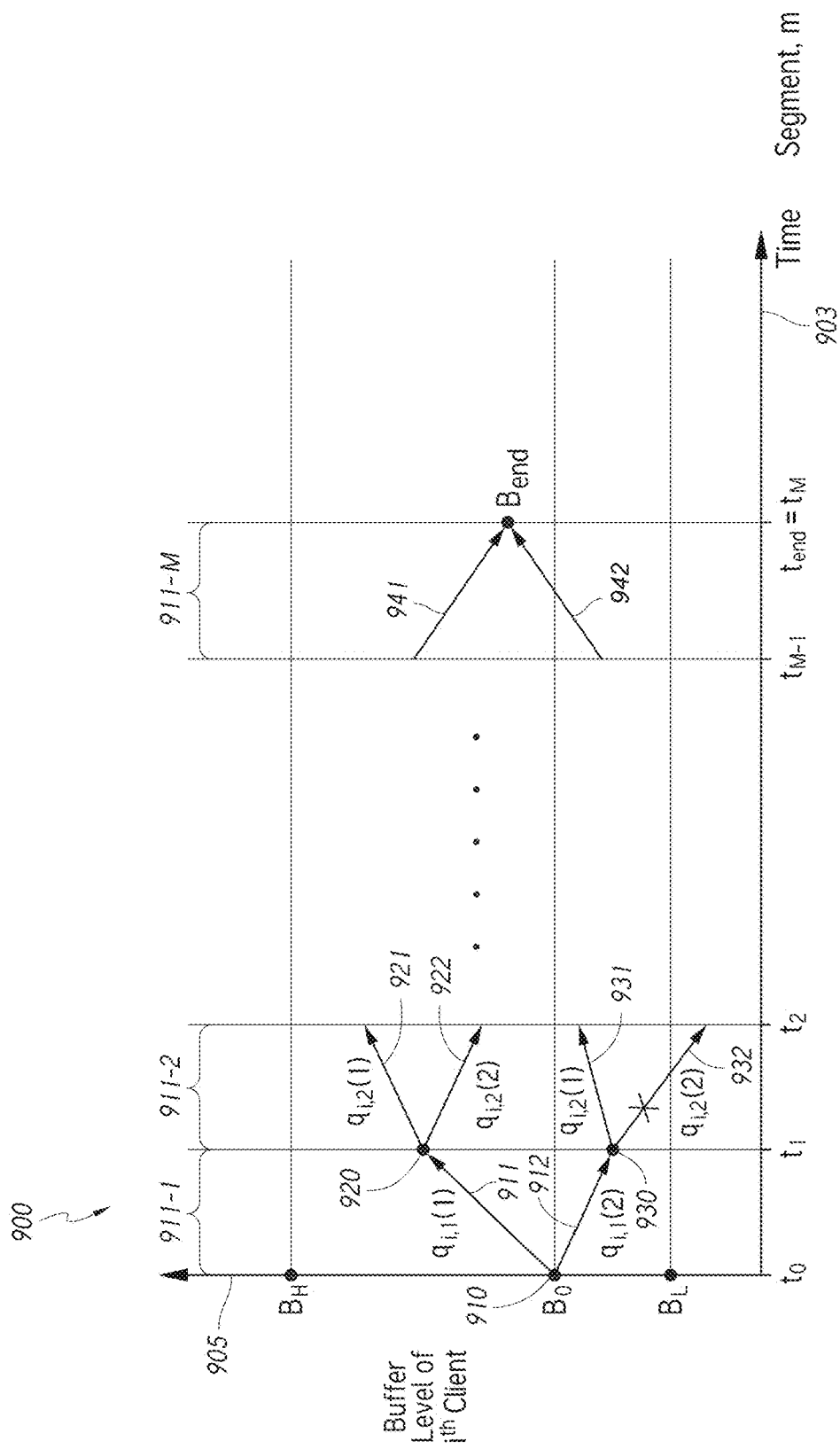
FIG. 9 is a trellis diagram illustrating segment representation selection using quality metrics and playout buffer boundary conditions according to some implementations.

FIG. 9 is a decision trellis diagram 900 illustrating playout buffer level tracking of a representative $i^{th}$ client device and segment representation selection using perceptual quality metrics and playout buffer boundary conditions according to some implementations. The independent axis 903 represents the downloading time of segment representations within a time horizon T. The dependent axis 905 represents the playout buffer level of the arbitrary $i^{th}$ client device, which is substantially representative of each of the N client devices sharing bandwidth on a bottleneck link. A time horizon T includes one or more temporal segments in which segment representations are provided to client devices. As an example, the decision trellis diagram 900 includes M temporal segments 911-1, 911-2, . . . , 911-M The first temporal segment 911-1 extends from $t_0$ to $t_1$, the second temporal segment 911-2 extends from $t_1$ to $t_2$, and so on until the final temporal segment 911-M, which extends from $t_{M-1}$ to $t_M$.

At time $t_0$, the playout buffer level of the $i^{th}$ client device starts at $B_0$ (910) between the lower and upper buffer bounds $B_L$, $B_H$. The lower bound $B_L$ provided to reduce playout buffer underflow at the representative $i^{th}$ client device. The upper bound $B_H$ characterizing an aggregate data rate, R, shared by the N client devices using shared network resource. In some implementations, the aggregate data rate in each segment, $R_m$, is substantially constant over one or more of temporal segments (i.e., $R_m = R, \forall m$).

In accordance with the dynamic programming method described in U.S. patent application Ser. No. 13/943,445, the playout buffer level is mapped across the one or more temporal segments in the time horizon T in order to produce a decision trellis as shown in FIG. 9. The decision trellis is used to identify segment representation selections that satisfy buffer boundary conditions (i.e., $B_0$, $B_L$, $B_H$, $B_{end}$) and at least one perceptual quality criterion across the time horizon T. To that end, starting at the initial buffer level $B_0$ at time $t_0$, the buffer level is mapped for each of two available segment representations having respective quality values denoted as $q_{i,1}(1)$ and $q_{i,1}(2)$. The first segment representation, having the value of $q_{i,1}(1)$, increases the buffer level to level 920 along path 911, because the first segment representation is encoded using a number of bits that would be downloaded faster than the playout buffer is read from. The second segment representation, having the value of $q_{i,1}(2)$, decreases the buffer level to level 930 along path 912, because the second segment representation is encoded using a number of bits that would be downloaded slower than the playout buffer is read from.

For the second temporal segment 911-2, starting from level 920, the buffer level is mapped for each of two available segment representations having respective quality values denoted as $q_{i,2}(1)$ and $q_{i,2}(2)$ along corresponding paths 921, 922. Similarly, also for the second temporal segment 911-2, starting from level 930, the buffer level is mapped for each of the two available segment representations having respective quality values denoted as $q_{i,2}(1)$ and $q_{i,2}(2)$ along corresponding paths 931, 932. The path 932 leads to a buffer level that violates the lower bound $B_L$. As such, the path 932 and the buffer level it leads to are eliminated from further consideration (as denoted by the "x" in FIG. 9), because using the path 932 would result in a segment representation selection for the second temporal segment 911-2 that could cause buffer underflow. Similarly, selections that would cause the buffer level to violate the upper bound $B_H$ are also eliminated from further consideration. In this manner, the decision trellis 900 is constructed throughout the M temporal segments in the time horizon T. In some implementations, a final buffer level value $B_{end}$ associated with each of the plurality of client devices is enforced. The final buffer level value $B_{end}$ characterizes the utilization of respective playout buffers correspondingly associated with the plurality of client devices at the end of a final temporal segment 911-M within the time horizon T. As such, segment representations are selected for the final temporal segment 911-M that force the buffer level to the final buffer level value $B_{end}$, which is shown for example on paths 941, 942. Once the decision trellis 900 has been constructed, segment representations are selected for each temporal segment by back-tracing through the decision trellis 900 to identify segment representations that satisfy at least one perceptual quality criterion across the time horizon T.

Figure 10:
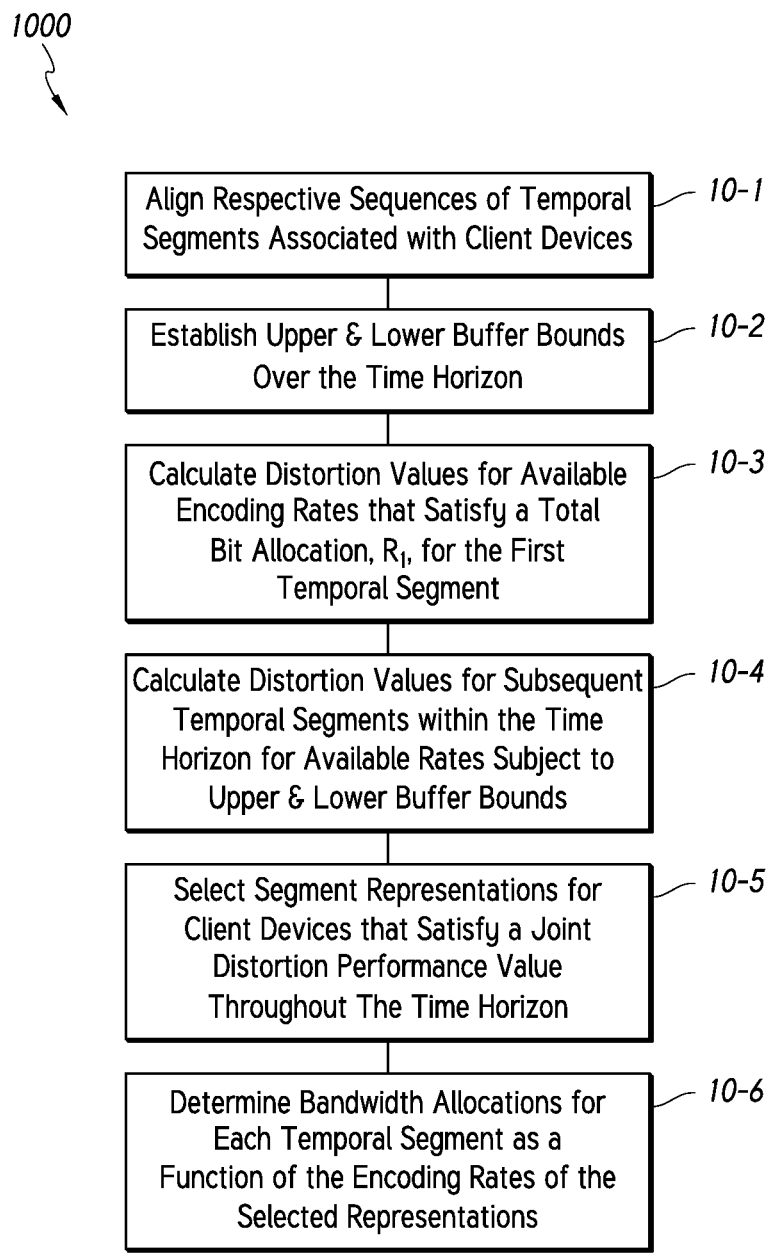
FIG. 10 is a flowchart representation of a method of joint quality management across multiple devices in accordance with some implementations.

FIG. 10 is a flowchart representation of a method 1000 of joint quality management across multiple devices in accordance with some implementations. In some implementations, the method 1000 is performed by a resource management module associated with a network administration node (e.g., network administration node 142) and/or a resource bottleneck node (e.g., headend node 150, etc.). Briefly, the method 1000 includes determining distortion values for one or more temporal segments for one or more encoding rates of one or more segment representations that satisfy the at least one buffer boundary condition; selecting one or more segment representations at particular encoding rates that satisfy a joint distortion performance value for the aggregation of sequences associated with the plurality of client devices; and determining bandwidth allocations for the plurality of client devices, for each of the one or more temporal segments, as a function of the encoding rates of the selected segment representations.

To that end, as represented by block 10-1, the method 1000 includes aligning respective sequences of one or more temporal segments associated with corresponding client devices. For example, in some implementations, aligning the respective sequences includes constraining temporal segments for the plurality of client devices such that a respective start time of a temporal segment for each of the plurality of client devices falls within a first threshold variance of a collective start time within a time horizon including at least one temporal segment. In some implementations, aligning the respective sequences includes constraining temporal segments for the plurality of client devices such that a respective end time of a temporal segment for each of the plurality of client devices falls within a second threshold variance of a collective end time within the time horizon including at least one temporal segment.

As represented by block 10-2, the method 1000 includes establishing upper and lower buffer bounds over a time horizon T For example, as shown in FIG. 9, an upper bound $B_H$ is provided over the time horizon T that includes n temporal segments. As noted above, the upper bound $B_H$ characterizes an aggregate data rate shared by the plurality of client devices using shared network resource. Also, as shown in FIG. 9, a lower bound is $B_L$ is provided over the time horizon T that includes n temporal segments. As noted above, the lower bound $B_L$ is provided to reduce playout buffer underflow by at least one of the plurality of client devices.

As represented by block 10-3, the method 1000 includes calculating distortion values $\{d^{(p)}((t_0, b_0) \rightarrow (t_1, b_1))\}$ for available encoding rates that satisfy a first total bit allocation, $R_1$, for the first temporal segment (i.e., $t_0 \rightarrow t_1$) ranging from $\Sigma r_{i,m}^{(1)}$ to $\Sigma r_{i,m}^{(K)}$, where p identifies preferred rate selections. In general, the total bit allocation shared by the N client devices for the $m^{th}$ segment is denoted as $R_m$. And, as described below, the method 1000 also includes calculating distortion values $\{d^{(p)}((t_{m-1}, b_{m-1}) \rightarrow (t_m, b_m))\}$ for encoding rates that satisfy a total bit allocation, $R_m$, for the $m^{th}$ temporal segment (i.e., $t_{m-1} \rightarrow t_m$), for values of $R_m$.

Additionally, for notational convenience, $d_{i,m}(\cdot)$ is used to denote an empirical rate-distortion function for the $m^{th}$ segment representation in the $i^{th}$ stream. In other words, $d_{i,m}(r) = d_{i,m}^{(k)}$ for $r = r_{i,m}^{(k)}$.

In some implementations, the total distortion $d^T(m, R_m)$ for the $m^{th}$ segment is determined in accordance with equation (7) as follows, which is based on reducing total distortion. Additionally and/or alternatively, in some implementations, a measure for total quality $Q^T(m, R_m)$ for the $m^{th}$ segment can be determined because distortion and quality are inversely correlated in some circumstances.

$$d^T(m, R_m) = \min \Sigma_i^N d_{i,m}(r_{i,m}) \quad (7)$$

s.t., $\Sigma_i^N r_{i,m} < R_m$, $\forall t$

In some implementations, equation (7) can be solved by determining a marginal utility based function in which the total distortion relative to the available rates satisfies a performance criterion. In some implementations, a performance criterion includes minimizing distortion or reducing distortion relative to a threshold value. For example, a marginal utility based function includes reducing a rate cost for a particular distortion threshold target value. In some implementations, reducing rate cost involves selecting rates that improve the distortion performance for two or more client devices sharing a portion of bandwidth, such that each client device is provided with bandwidth that increases joint distortion performance. Those of ordinary skill in the art will appreciate that marginal utility is an indication of incremental gain relative to the incremental cost.

In some implementations, a distortion value $d^{(p)}((t_0, b_0) \to (t_1, b_1))$ is determined in accordance with equation (8) as follows:

$$d^{(p)}((t_{m-1}, b_{m-1}) \to (t_m, b_m)) = R_m d^T(m, R_m) \quad (8)$$

In some implementations, a solution to equation (8) is provided in accordance with the Bellman equation of equation (9) as follows:

$$d^{(p)}((t_m, b_m) \to (t_l, b_l)) = \min[(d((t_m, b_m) \to (t_s, b_s))) + (d((t_s, b_s) \to (t_l, b_l)))] \quad (9)$$

s.t., $m < s < l$ and $B_L \le b_s \le B_H$

As represented by block 10-4, the method 1000 includes calculating distortion values for subsequent temporal segments (i.e., m=2, 3 . . . , M) within the time horizon T for available encoding bitrates that fall within the upper and lower bounds, $B_H$ and $B_L$, in a similar manner using equations (7), (8) and (9). As represented by block 10-5, the method 1000 includes selecting segment representations for each of the N client devices that satisfy a joint distortion performance value throughout the time horizon T, by back tracing through a decision trellis as shown in FIG. 9. In some implementations, selecting segment representations includes: allocating respective bit allocations to each of the plurality of client device based on marginal utility ranking associated with the segment representations, wherein the summation of the respective bit allocations are bound by a corresponding total bit allocation per temporal segment; producing a vector of quality values corresponding to the corresponding total bit allocation per temporal segment; aggregating bit allocations per temporal segment; and selecting one or more segment representations for each of the plurality of client devices at particular encoding rates that satisfy a joint distortion performance value for the aggregated bit allocations.

As represented by block 10-6, the method 1000 includes determining the bandwidth allocations $\{c_{i,t}\}$ for the N client devices on a temporal segment basis as a function of the encoding bitrates $\{r_{i,t}\}$ of the selected segment representations. As noted above, in some implementations, the bandwidth allocations $\{c_{i,t}\}$ are determined using equation (4).

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein. In another example, various portions of the disclosed methods may be practiced and/or performed in various sequences and/or combinations, including simultaneously.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   aligning sequences of one or more temporal segments such that time boundaries of temporal segments across the sequences are in alignment, wherein each sequence is associated with a respective one of a plurality of client devices sharing a network resource, wherein each sequence is associated with an instance of a respective video stream, and the one or more temporal segments of each sequence are used to provide segment representations of media content data to one of the plurality of client devices; and
   selecting segment representations for each temporal segment, for each sequence, based on a combination of the sequence alignment and perceptual quality level values associated with available segment representations, wherein a combination of resulting perceptual quality levels satisfies a joint quality criterion across the sequences;

wherein alignment of time boundaries of temporal segments across the sequences is achieved at least in part by adjusting performance characteristics associated with at least some of the one or more temporal segments.

2. The method of claim 1, wherein adjusting the performance characteristics includes a combination of aligning start or end times of at least some of the one or more temporal segments, adjusting the data size of at least some of the one or more temporal segments, and limiting and/or shaping an available aggregate rate or bandwidth.

3. The method of claim 1, further comprising determining a respective allocation of the shared network resource provided to each of the plurality of client devices, wherein the respective allocation of the shared network resource provided to a particular client device during a particular temporal segment is a function of an encoding rate of one or more segment representations selected for the particular temporal segment for the particular client device.

4. The method of claim 1, further comprising determining at least one buffer boundary condition that characterizes an aggregate limiting rate at which segment representations can be provided to the plurality of client devices during each temporal segment, and wherein selecting segment representations is also based on the at least one buffer boundary condition.

5. The method of claim 4, wherein the at least one buffer boundary condition includes at least one of:
a lower bound provided to reduce playout buffer underflow by at least one of the plurality of client devices; and
an upper bound characterizing an aggregate data rate shared by the plurality of client devices using shared network resource.

6. The method of claim 4, further comprising obtaining an initial buffer level value for each of the plurality of client devices, wherein each initial buffer level value characterizes a limiting rate at which media content data can be provided to a particular client device.

7. The method of claim 4, the at least one buffer boundary condition includes a final buffer level value associated with each of the plurality of client devices, wherein the final buffer level value characterizes the utilization of respective playout buffers correspondingly associated with the plurality of client devices at the end of a final temporal segment within a time horizon.

8. The method of claim 4, wherein selecting segment representations comprises:
determining distortion values for one or more temporal segments for one or more encoding rates of one or more segment representations that satisfy the at least one buffer boundary condition;
selecting one or more segment representations at particular encoding rates that satisfy a joint distortion performance value for the aggregation of sequences associated with the plurality of client devices; and
determining individual bandwidth allocations for each of the plurality of client devices, for each of the one or more temporal segments, as a function of the encoding rates of the selected segment representations.

9. The method of claim 1, further comprising obtaining media content selection information associated with each of the plurality of client devices, wherein media content selection information includes one or more perceptual quality level values that are correspondingly associated with one or more encoding rates of one or more segment representations available during a temporal segment for particular media content data.

10. The method of claim 1, wherein aligning the respective sequences includes aligning the respective sequences within a time horizon that includes at least one temporal segment.

11. The method of claim 1, further comprising:
obtaining an indicator that a respective playout buffer level associated with a particular one of the plurality of client devices has breached a lower threshold; and
selecting two or more segment representations for a single temporal segment associated with the particular one of the plurality of client devices in response to obtaining the indicator.

12. The method of claim 1, wherein aligning the sequences of one or more temporal segments comprises at least one of:
constraining temporal segments for the plurality of client devices such that a respective start time of a temporal segment for each of the plurality of client devices falls within a first threshold variance of a collective start time within a time horizon including at least one temporal segment; and
constraining temporal segments for the plurality of client devices such that a respective end time of a temporal segment for each of the plurality of client devices falls within a second threshold variance of a collective end time within the time horizon including at least one temporal segment.

13. The method of claim 1, wherein the perceptual quality level values include at least one of a peak-signal-to-noise ratio, a mean opinion score, a video quality metric, an encoding rate, an encoding quantization parameter, and subscription tier data.

14. The method of claim 4, wherein selecting segment representations comprises:
allocating respective bit allocations to each of the plurality of client devices based on marginal utility ranking associated with the segment representations, wherein the summation of the respective bit allocations are bound by a corresponding total bit allocation per temporal segment;
producing a vector of quality values corresponding to the corresponding total bit allocation per temporal segment;
aggregating bit allocations per temporal segment; and
selecting one or more segment representations for each of the plurality of client devices at particular encoding rates that satisfy a joint distortion performance value for the aggregated bit allocations.

15. The method of claim 1, wherein satisfying the joint quality criterion across the sequences is an indicator of at least one of:
an increase in the number of sequences that are provided within a fixed and shared allocation of bandwidth;
a more even distribution of perceptual quality level values amongst client devices within a particular subscription tier;
an increase in an aggregation of respective resulting perceptual quality level values for corresponding client devices sharing a fixed allocation of bandwidth; and
a decrease in an aggregate distortion level characterizing respective distortion levels associated with corresponding client devices sharing a fixed allocation of bandwidth.

16. An apparatus comprising:
a processor; and
non-transitory memory including:
- logic configured to align sequences of one or more temporal segments such that time boundaries of temporal segments across the sequences are in alignment, wherein each sequence is associated with a respective one of a plurality of client devices sharing a network resource, and wherein each sequence is associated with an instance of a respective video stream, and the one or more temporal segments of each sequence are used to provide segment representations of media content data to one of the plurality of client devices;
- logic configured to select segment representations for each temporal segment, for each sequence, based on a combination of the sequence alignment and perceptual quality level values associated with available segment representations, wherein a combination of resulting perceptual quality levels satisfies a joint quality criterion across the sequences; and
- an interface to the shared network resource configured to meter a respective allocation of the shared network resource provided to each of the plurality of client devices based on the alignment of sequences and selected segment representations; wherein, in the logic configured to align the sequences, alignment of time boundaries of temporal segments across the sequences is achieved at least in part by adjusting performance characteristics associated with at least some of the one or more temporal segments.

17. The apparatus of claim 16, wherein adjusting the performance characteristics includes a combination of aligning start or end times of at least some of the one or more temporal segments, adjusting the data size of at least some of the one or more temporal segments, and limiting and/or shaping an available aggregate rate or bandwidth.

18. The apparatus of claim 16, wherein the respective allocation of the shared network resource provided to a particular client device, by the interface, during a particular temporal segment is a function of an encoding rate of one or more segment representations selected for the particular temporal segment for the particular client device.

19. The apparatus of claim 16, further comprising logic configured to determine at least one buffer boundary condition that characterizes an aggregate limiting rate at which segment representations can be provided to the plurality of client devices during each temporal segment, and wherein selecting segment representations is also based on the at least one buffer boundary condition.

20. The apparatus of claim 16, wherein satisfying the joint quality criterion across the sequences is an indicator of at least one of:
- an increase in the number of sequences that are provided within a fixed and shared allocation of bandwidth;
- a more even distribution of perceptual quality level values amongst client devices within a particular subscription tier;
- an increase in an aggregation of respective resulting perceptual quality level values for corresponding client devices sharing a fixed allocation of bandwidth; and
- a decrease in an aggregate distortion level characterizing respective distortion levels associated with corresponding client devices sharing a fixed allocation of bandwidth.

* * * * *